United States Patent
Saeda et al.

(10) Patent No.: US 11,985,272 B2
(45) Date of Patent: May 14, 2024

(54) INFORMATION PROCESSING APPARATUS THAT PROVIDES OPERATION GUIDANCE

(71) Applicant: SHARP KABUSHIKI KAISHA, Sakai (JP)

(72) Inventors: Masao Saeda, Sakai (JP); Yasuhiro Nakai, Sakai (JP); Kohichi Murakami, Sakai (JP); Yasutomo Hayano, Sakai (JP); Emiko Matsuo, Sakai (JP); Manami Takao, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/123,199

(22) Filed: Mar. 17, 2023

(65) Prior Publication Data

US 2023/0319193 A1 Oct. 5, 2023

(30) Foreign Application Priority Data

Mar. 30, 2022 (JP) .................................. 2022-056662

(51) Int. Cl.
 *H04N 1/00* (2006.01)
 *G06V 20/52* (2022.01)
(52) U.S. Cl.
 CPC ......... *H04N 1/00076* (2013.01); *G06V 20/52* (2022.01); *H04N 1/00037* (2013.01); *H04N 2201/0094* (2013.01)
(58) Field of Classification Search
 USPC ......................................................... 358/1.15
 See application file for complete search history.

(56) References Cited

U.S. PATENT DOCUMENTS

| 2014/0160511 A1* | 6/2014 | Yamada | H04N 1/32635 358/1.14 |
| 2018/0220011 A1* | 8/2018 | Nakatsu | G06K 7/10722 |

FOREIGN PATENT DOCUMENTS

JP H08-202577 A 8/1996

* cited by examiner

*Primary Examiner* — Jacky X Zheng
(74) *Attorney, Agent, or Firm* — ScienBiziP, P.C.

(57) ABSTRACT

An information processing apparatus includes a storage that stores operation explanation information for explaining task contents to be performed on the information processing apparatus, an operation explanation display controller that displays operation explanation information related to a specific task to be performed on the information processing apparatus, a task information acquirer that acquires information about a task performed on the information processing apparatus when the operation explanation information is displayed, an erroneous task determiner that determines that an erroneous task is performed on the information processing apparatus when the acquired information about a task differs from contents information of the specific task indicated in the displayed operation explanation information, and a warning processor that notifies warning information indicating that a task different from the specific task indicated in the displayed operation explanation information is performed when it is determined that the erroneous task is performed.

13 Claims, 14 Drawing Sheets

FIG. 2

| RECOGNIZED IMAGE INFORMATION 53 | |
|---|---|
| CONSUMABLE ITEM IMAGE | SIZE: GA01 |
| | SHAPE: GA02 |
| | NUMBER: GA03 |
| | LABEL COLOR: GA04 |
| OPERATION POSITION IMAGE | FRONT DOOR: GA11 |
| WORK IMAGE | WORK: GA21 |

FIG. 3

| DETECTED WORK INFORMATION 54 | |
|---|---|
| DOOR OPENING AND CLOSING DETECTION SENSOR | ON / OFF |
| CONVEYED SHEET DETECTION SENSOR | ON / OFF |
| SHEET TRAY DETECTION SENSOR | ON / OFF |
| INK CASSETTE DETECTION SENSOR | ON / OFF |

FIG. 4

| OPERATION EXPLANATION CORRESPONDENCE INFORMATION | | 55 |
|---|---|---|
| OPERATION EXPLANATION DISPLAY SCREEN | EXPLANATION SCREEN MG01 | EXPLANATION SCREEN MG02 |
| OPERATION GUIDANCE NAME | INK CASSETTE REPLACEMENT | SHEET CONVEYANCE ERROR |
| WORK POSITION, DETAILS | FRONT DOOR: OPEN | FRONT DOOR: OPEN |
| WORK POSITION | INK CASSETTE POSITION | SHEET CONVEYANCE PATH |
| RECOGNIZED IMAGE | INK CASSETTE SIZE: A01 SHAPE: A02 NUMBER: A03 LABEL COLOR: A04 | CONVEYANCE PATH IMAGE |
| RECOGNIZED MOVING IMAGE | OPERATION METHOD IMAGE | OPERATION METHOD IMAGE |

FIG. 5

| ERRONEOUS WORK NOTIFICATION SETTING INFORMATION 56 | | |
|---|---|---|
| OPERATION EXPLANATION DISPLAY SCREEN | EXPLANATION SCREEN MG01 | EXPLANATION SCREEN MG02 |
| ERRONEOUS OPERATION, ERRONEOUS WORK | INK CASSETTE REPLACEMENT | SHEET CONVEYANCE ERROR |
| WARNING INFORMATION (INDICATION DISPLAY OF ERRONEOUS OPERATION, ERRONEOUS WORK) | FRONT DOOR POSITION | FRONT DOOR POSITION |
| | INK CASSETTE INSTALLATION POSITION | CONVEYANCE PATH POSITION |
| | INK CASSETTE SIZE: A01 SHAPE: A02 NUMBER: A03 LABEL COLOR: A04 | |
| COPING INFORMATION | OPERATION METHOD EXPLANATION | OPERATION METHOD EXPLANATION |
| | WORK METHOD EXPLANATION | WORK METHOD EXPLANATION |

FIG. 6

NOTIFICATION INFORMATION 57

INK CASSETTE REPLACEMENT REQUEST SCREEN

INK RIBBON IN INK CASSETTE IS EMPTY.

SCREEN DURING SHEET FEEDING ERROR

SHEET CONVEYANCE PROBLEM HAS OCCURRED.

CONSUMABLE ITEM REPLACEMENT EXPLANATION SCREEN

PREPARE FOLLOWING CONSUMABLE ITEM
PAY ATTENTION TO SIZE, SHAPE, AND COLOR OF BOX

FIG. 7

NOTIFICATION INFORMATION 57

| INK CASSETTE REPLACEMENT WARNING SCREEN | (WHEN INK CASSETTE TYPE IS WRONG) |

TYPE OF CONSUMABLE ITEM TO BE INSTALLED IS DIFFERENT
CHECK COLOR AND NUMBER OF CONSUMABLE ITEM

| INK CASSETTE REPLACEMENT COPING SCREEN | (WHEN INK CASSETTE TYPE IS WRONG) |

RETURN WRONG CONSUMABLE ITEM TO STORAGE POSITION AND PREPARE FOLLOWING CORRECT CONSUMABLE ITEM

| INK CASSETTE REPLACEMENT WARNING SCREEN | (WHEN INK CASSETTE IS IMPROPERLY INSTALLED) |

INSTALLATION OF CONSUMABLE ITEM IS INCOMPLETE
CHECK INSTALLATION STATUS OF CONSUMABLE ITEM

| INK CASSETTE REPLACEMENT COPING SCREEN | (WHEN INK CASSETTE IS IMPROPERLY INSTALLED) |

REMOVE CONSUMABLE ITEM
ALIGN SHAFT OF INK RIBBON WITH GROOVE OF INK CASSETTE AND PRESS HARD WITH FINGER UNTIL CLICK SOUNDS

FIG. 10

CONSUMABLE ITEM (INK CASSETTE)
REPLACEMENT REQUEST SCREEN: G1     13 DISPLAY

INK RIBBON IN INK CASSETTE IS EMPTY.

SEE EXPLANATION IMAGE TO REPLACE
CONSUMABLE ITEM (INK CASSETTE)

[SHOW EXPLANATION IMAGE]  [NOT SHOW EXPLANATION IMAGE]

FIG. 11

SCREEN DURING SHEET FEEDING
ERROR: G2     13 DISPLAY

SHEET CONVEYANCE PROBLEM HAS OCCURRED.

SEE EXPLANATION IMAGE TO REMOVE SHEET

[SHOW EXPLANATION IMAGE]  [NOT SHOW EXPLANATION IMAGE]

INFORMATION PROCESSING APPARATUS THAT PROVIDES OPERATION GUIDANCE

BACKGROUND OF THE INVENTION

Field of the Invention

The present disclosure relates to an information processing apparatus, and more particularly to an information processing apparatus having a function of displaying an operation explanation related to tasks such as a component replacement task of the information processing apparatus.

Description of the Background Art

Conventionally, an image forming apparatus (also known as a multifunction machine) having many functions including printing, document reading, transmission of read image data, facsimile (FAX) transmission/reception, e-mail transmission/reception, acquisition of image data, character recognition, and the like is utilized.

In the image forming apparatus, when it is necessary to replace consumable items such as toner cartridges, or when a problem such as a trouble in conveying printing sheets occurs, it is necessary to perform a task of replacing the consumable items or troubleshooting the problem.

Such a task of replacing the consumable items or troubleshooting the problem is generally often performed by a person in charge of managing the image forming apparatus, but a person not accustomed to the replacement task sometimes performs the task.

Therefore, to enable even such a person not accustomed to replace consumable items or the like, a series of operation explanations (operation guidance) to be performed in the replacement task or the like are displayed in an easy-to-understand manner in the order of tasks.

Further, in the related art, an information processing apparatus is known in which after a component to be operated for restoring a failure is designated based on diagnostic contents from a failure diagnosis device, a task contents observation device detects an operation performed by a task worker, based on predetermined observation data, and if it is determined, from task start observation data, that the task has started, an explanation of overall components is created, the failure contents are inferred, the task contents for restoring the failure are created, and after the task is supported either by voice or display depending on the task contents, the contents of the current task by the task worker are observed, it is determined whether the current task has ended, and if the current task has not ended, an explanation of the current task components is created, the consistency between the task contents defined in the task procedure and the current task contents is checked, and the task is supported again. Further, according to the information processing apparatus, the subsequent task contents are sequentially displayed depending on the task contents performed by the task worker.

However, when an operation explanation (operation guidance) for the replacement task or the like is displayed, a person performing the replacement task, such as the person in charge of managing the information processing apparatus, may still incorrectly install a member to be replaced even after understanding an operation itself to be performed either by thoroughly reading the operation explanation or by listening to the operation explanation by voice.

For example, in a case of using a dye sublimation printer, a photo sheet and a sealing sheet may be employed for consumable printing sheets. A box for storing the photo sheet and a box for storing the sealing sheet may have very similar outer appearance, and thus, with the carelessness of a person replacing a sheet, the replacement member (printing sheets) may be erroneously installed in the image forming apparatus.

As known in the related art, even if the subsequent task contents is sequentially displayed according to the task contents performed by the task worker, incorrect consumable items or the like may be installed by mistake as the above case.

Also, when consumable items are replaced, the shapes of correct consumable items and incorrect consumable items may be the same, making it difficult to distinguish the consumable items, based on their appearance, and in some cases, a correct consumable item and an incorrect consumable item cannot be determined until the consumable item is actually installed, and thus, the fact that an incorrect consumable item is installed may be found only after the consumable item is actually installed.

Thus, if a member different from a proper member to be replaced is erroneously installed, it is necessary to return the erroneously installed member to a storage box that has already been unpacked, and during the task of returning, the erroneously installed member may be dirty or damaged.

Also, if the image forming apparatus is operated while the erroneously installed member is installed, the erroneously installed member cannot be reused, and thus, the erroneously installed member itself may be useless.

If the operation explanations are simply displayed sequentially, the task worker may perform an erroneous process, for example, may incorrectly install replacement members, and because it is necessary to perform the tasks of returning the erroneously installed replacement member and installing the correct replacement member, the workload on the person in charge of management may not be reduced in replacing consumable items and at other times.

Therefore, the present disclosure has been made in consideration of the above circumstances, and the object of the present disclosure is to detect an erroneous task in a task of replacing consumable items or the like, and a task of responding to problems in an apparatus or replacing components at the earliest possible stage of a replacement task or the like, so that a task worker can be notified about the erroneous task to avoid the replacement members from being useless, also suppress an unnecessary task by a person in charge of management, and reduce the workload on the person in charge of management.

SUMMARY OF THE INVENTION

The present disclosure provides an information processing apparatus having a function of explaining a predetermined operation and task contents, and the information processing apparatus includes a display, a storage that stores operation explanation information for explaining task contents to be performed on the information processing apparatus, an operation explanation display controller that displays, on the display, operation explanation information related to a specific task to be performed on the information processing apparatus, a task information acquirer that acquires information about a task performed on the information processing apparatus when the operation explanation information is displayed, an erroneous task determiner that determines, if the acquired information about a task differs from contents information of the specific task indicated in the operation explanation information displayed on the display, that an erroneous task is performed on the information processing apparatus, and a warning processor that notifies warning information indicating that a task different from the specific task indicated in the operation explanation information displayed on the display is performed if it is determined that the erroneous task is performed.

Further, the present disclosure provides an information processing apparatus having a function of explaining a predetermined operation and task contents, and the information processing apparatus includes a display, an image capturer that captures the information processing apparatus and a space around the information processing apparatus and acquires captured image data, a storage that stores operation explanation information for explaining task contents to be performed on the information processing apparatus, an operation explanation display controller that displays, on the display, operation explanation information related to a specific task to be performed on the information processing apparatus, an image recognizer that recognizes the captured image data acquired when the operation explanation information is displayed and acquires recognized image information related to the operation explanation information displayed on the display from the captured image data, an erroneous task determiner that determines, if the acquired recognized image information differs from contents information of the specific task indicated in the operation explanation information displayed on the display, that an erroneous task is performed on the information processing apparatus, and a warning processor that notifies warning information indicating that a task different from the specific task indicated in the operation explanation information displayed on the display is performed if it is determined that the erroneous task is performed.

The information processing apparatus further includes a task detector that detects an input operation or a task performed on the information processing apparatus when the operation explanation information is displayed, and acquires the input operation or the task as detected task information, and the erroneous task determiner determines, if the acquired detected task information differs from the contents information of the specific task indicated in the operation explanation information displayed on the display, that an erroneous task is performed on the information processing apparatus.

Further, the information processing apparatus stores in advance, in the storage, operation explanation correspondence information that correlates the operation explanation information displayed on the display with the task contents to be performed and image contents to be subjected to image recognition in correspondence to the operation explanation information, and the erroneous task determiner compares the acquired recognized image information and the acquired detected task information with the operation explanation correspondence information to determine whether an erroneous task is performed on the information processing apparatus.

The information processing apparatus further includes a coping method processor that, if the erroneous task determiner determines that an erroneous task is performed, resolves the erroneous task and notifies coping information indicating normal task contents to be performed.

If, after the warning information is notified by the warning processor, a person having performed a task on the information processing apparatus performs a predetermined input operation for confirming the coping information indicating the normal task contents, the coping method processor notifies the coping information.

Further, if an erroneous task is performed on the information processing apparatus, the information processing apparatus stores, in advance, in the storage, erroneous task notification setting information including the warning information to be notified and the coping information indicating the normal task contents to be performed, and if it is determined by the erroneous task determiner that an erroneous task is performed, warning information or coping information corresponding to task contents determined as the erroneous task is selected from the erroneous task notification setting information, and the selected warning information is notified by the warning processor, or the selected coping information is notified by the coping method processor.

The warning information is notified by at least one or both of displaying the warning information on the display and outputting the warning information by voice.

The coping information is notified by at least one or both of displaying the coping information on the display and outputting the coping information by voice.

When a predetermined function of the information processing apparatus is executed, if, after a malfunction of the information processing apparatus is detected, a task of resolving the malfunction is performed, the erroneous task determiner determines, if the task of resolving the malfunction differs from the contents information of the specific task indicated in the operation explanation information displayed on the display, that an erroneous task is performed on the information processing apparatus.

When, after a need to replace a consumable item installed on the information processing apparatus arises, a task of replacing the consumable item is performed, the erroneous task determiner determines, if the task of replacing the consumable item differs from the contents information of the specific task indicated in the operation explanation information displayed on the display, that an erroneous task is performed on the information processing apparatus.

When, after a need to replace a consumable item installed on the information processing apparatus arises, a task of bringing a box containing a new consumable item for replacement to an installation position of the information processing apparatus is performed, the erroneous task determiner determines, if the new consumable item inside the box being not a correct consumable item is detected based on the recognized image information acquired by the image recognizer before the box is unpacked, that an erroneous task is performed on the information processing apparatus.

Further, the information processing apparatus is an image forming apparatus having a plurality of functions.

The present disclosure provides an erroneous task warning notification method of an information processing apparatus, in which a controller provided in the information processing apparatus causes the information processing apparatus to execute storing, in advance, operation explanation information for explaining task contents to be performed on the information processing apparatus, displaying operation explanation information related to a specific task to be performed on the information processing apparatus, acquiring information about a task performed on the information processing apparatus when the operation explanation information is displayed, determining that an erroneous task is performed on the information processing apparatus if the acquired information about a task differs from contents information of the specific task indicated in the displayed operation explanation information, and notifying warning information indicating that a task different from the specific task indicated in the displayed operation explanation information is performed when it is determined that an erroneous task is performed.

Further, the present disclosure provides an erroneous task warning notification method of an information processing apparatus, in which a controller provided in the information processing apparatus causes the information processing apparatus to execute capturing the information processing apparatus and a space around the information processing apparatus and acquiring captured image data, storing, in advance, operation explanation information for explaining task contents to be performed on the information processing apparatus, displaying operation explanation information related to a specific task to be performed on the information processing apparatus, recognizing the captured image data acquired when the operation explanation information is displayed and acquiring recognized image information related to the operation explanation information displayed from the captured image data, determining that an erroneous task is performed on the information processing apparatus if the acquired recognized image information differs from contents information of the specific task indicated in the displayed operation explanation information, and notifying warning information indicating that a task different from the specific task indicated in the displayed operation explanation information is performed when it is determined that the erroneous task is performed.

According to the present disclosure, the information processing apparatus includes the task information acquirer that acquires information about the task performed on the information processing apparatus when operation explanation information is displayed, the erroneous task determiner that determines that the erroneous task is performed on the information processing apparatus when the acquired information about a task differs from contents information of the specific task indicated in the displayed operation explanation information, and the warning processor that notifies warning information indicating that the task different from the specific task indicated in the displayed operation explanation information is performed when it is determined that the erroneous task is performed. Therefore, during a task of replacing consumable items or the like, and a task of responding to troubles in the apparatus or replacing components, it is possible to detect an erroneous task at the earliest possible stage of the replacement task or the like so that a task worker can be notified about the erroneous task to avoid replacement members from being useless, also suppress an unnecessary task by a person in charge of management, and thus reduce the workload on the person in charge of management.

BRIEF DESCRIPTION OF THE DRAWINGS

FIG. 2 is a diagram for explaining an example of information stored in a storage of the image forming apparatus according to the present disclosure.

FIG. 3 is a diagram for explaining an example of information stored in a storage of the image forming apparatus according to the present disclosure.

FIG. 4 is a diagram for explaining an example of information stored in a storage of the image forming apparatus according to the present disclosure.

FIG. 5 is a diagram for explaining an example of information stored in a storage of the image forming apparatus according to the present disclosure.

FIG. 6 is a diagram for explaining an example of information stored in a storage of the image forming apparatus according to the present disclosure.

FIG. 7 is a diagram for explaining an example of information stored in a storage of the image forming apparatus according to the present disclosure.

FIG. 10 is a diagram for explaining an example of a screen displayed on a display of the image forming apparatus according to the present disclosure.

FIG. 11 is a diagram for explaining an example of a screen displayed on a display of the image forming apparatus according to the present disclosure.

DESCRIPTION OF THE PREFERRED EMBODIMENTS

Embodiments of the present disclosure will be described below using the drawings. It is noted that the present disclosure shall not be limited in any way by the description of examples below.

The information processing apparatus according to the present disclosure is an apparatus having a function of explaining contents of a predetermined operation and a task to be performed on the information processing apparatus, and has, for example, a function of notifying a task worker, such as a person in charge of management, of an explanation of the operation contents to be performed during a task of replacing replacement members such as consumable items installed on the information processing apparatus, a maintenance task to deal with troubles occurring in the information processing apparatus, and a task of replacing a malfunctioning member.

Operation explanation information (hereinafter, also referred to as operation guidance) for explaining the contents of a task to be performed on the information processing apparatus is stored in advance in the information processing apparatus.

For example, information related to an explanation of the operation contents to be performed in each replacement task of replacement members (including an operation position, information identifying a replacement member, a task image, and the like) is stored in advance in the operation explanation information.

In the following examples, an image forming apparatus corresponding to the information processing apparatus and having a plurality of functions will be described.

It is noted that the information processing apparatus is not limited to the image forming apparatus, and may be any electronic equipment having multiple functions, including a personal computer, a scanner, a display device, a mobile communication terminal, and the like.

Figure 1:
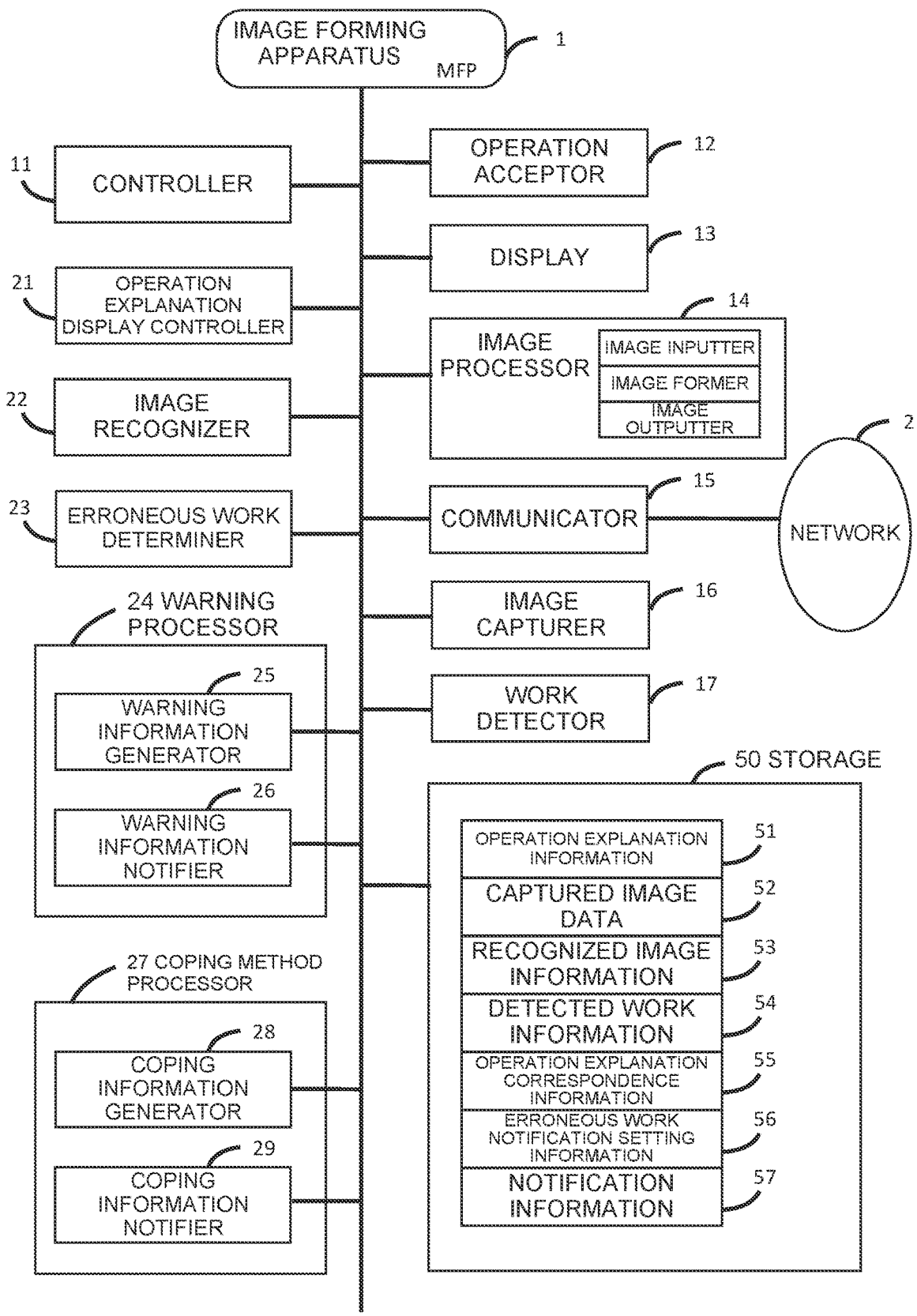
FIG. 1 is a block diagram of a configuration in an example of an image forming apparatus according to the present disclosure.

Configuration of Image Forming Apparatus FIG. 1 is a block diagram illustrating a configuration of an example of an image forming apparatus according to the present disclosure.

The image forming apparatus (MFP: Multifunction Peripheral) is an apparatus for processing image data, and mainly, for example, inputs, forms, outputs, stores, and transfers image data.

An image forming apparatus 1 is also called a multifunction peripheral or simply a multifunction peripheral (MFP).

The image forming apparatus 1 is an electronic equipment having functions for processing image data, including a copying function, a printing function, a document reading (scanning) function, a document editing function, a document saving function, a document transmission/reception (fax transmission/reception, scanned document transmission) function, an e-mail transmission/reception function, a file transfer function, a communication function, and the like.

In the following examples, the image forming apparatus 1 according to the present disclosure will be described as one particularly having a copying function, a scanner function, and a communication function, but may have other functions as well.

In FIG. 1, the multifunction peripheral (MFP) 1 according to the present disclosure mainly includes a controller 11, an operation acceptor 12, a display 13, an image processor 14, a communicator 15, an image capturer 16, a task detector 17, an operation explanation display controller 21, an image recognizer 22, an erroneous task determiner 23, a warning processor 24, a coping method processor 27, and a storage 50.

Here, the image processor 14 mainly includes an image inputter, an image former, and an image outputter, as will be described later.

The task detector 17 and the image recognizer 22 are included in a task information acquirer that acquires information about a task performed on the information processing apparatus when operation explanation information is displayed.

The information about the task performed on the information processing apparatus includes detected task information acquired by the task detector 17 and recognized image information acquired by the image recognizer 22, as will be described later.

The warning processor 24 includes a warning information generator 25 and a warning information notifier 26, and the coping method processor 27 includes a coping information generator 28 and a coping information notifier 29.

The controller 11 controls operations of constituent components such as the display 13 and the image processor 14, and is mainly realized by a microcomputer including a central processing unit (CPU), a read only memory (ROM), a random access memory (RAM), an input/output (I/O) controller, a timer, and the like.

The CPU organically operates various types of hardware, based on a control program stored in advance in a non-volatile memory such as the ROM, and executes an image forming function, an image recognition function, and the like in the present disclosure.

Among the above components, the operation explanation display controller 21, the image recognizer 22, the erroneous task determiner 23, and the like are functional blocks in which the CPU executes processes, based on a predetermined program.

The operation acceptor 12 is an input device used, by a user of the image forming apparatus 1, for performing a predetermined input operation. For example, the operation acceptor 12 is a component through which information such as characters is input and selection of a function is entered, and includes a keyboard, a mouse, and a touch panel.

Keys operated by the user include an operation start key, a function selection key, a setting key, and the like.

The user executes reading a document, for example, by operating the touch panel or entering a start key of a reading operation or starts transmitting information to a predetermined destination by performing an operation of entering a transmission start key for starting transmission of information such as image data.

The display 13 is a component that displays information, and displays information necessary for executing each of the functions, execution results of the function, and the like to notify a user. For example, an LCD, an organic EL display, or the like is employed for the display 13, and if a touch panel is employed for the operation acceptor 12, the display 13 and the touch panel are arranged to overlap each other.

The display 13 displays, for example, settings of setting items used for printing or the like of the image forming apparatus 1, information necessary for executing a document reading function or the like, a screen for selecting a function to be executed (function selection screen), an operation screen for a selected function, a consumable item replacement request screen, and the like using characters, symbols, graphics, images, icons, animations, moving images, and the like.

In addition, in the present disclosure, the display 13 displays a consumable item replacement request screen, a replacement explanation screen, a replacement warning screen, a replacement coping screen, an error occurrence screen, and the like to notify a task worker of warnings for an erroneous task and a coping method for the erroneous task.

The image processor 14 is a component that executes an image forming function being a main function of the image forming apparatus 1, and mainly includes an image inputter, an image former, and an image outputter.

Primarily, the image inputter is a component used for inputting predetermined image data, the image former is a component that converts the input image data to information that can be printed or the like, and the image outputter is a component that outputs the formed print information or the like on a printing sheet or the like.

The image inputter is a component used for inputting image data of a document containing images, characters, graphics, and the like such as print data intended for printing, and is, for example, a component for reading a document placed on a platen or the like.

A scanner (reader) that reads a document on which information is described is employed for the image inputter.

The image forming apparatus 1 includes a document platen (platen) on which a document is placed, and a document cover for holding the document to read the document.

The image forming apparatus 1 may include an automatic document feeder (ADF) on which a plurality of documents are placed and which automatically conveys the plurality of documents to be read one by one.

A method of inputting image information includes various methods including, for example, reading, by a scanner, a document containing an image or the like and storing image data of the document (hereinafter, referred to as input image data) into the storage 50.

Alternatively, for example, an interface connecting an external storage medium such as a universal serial bus (USB) memory corresponds to the image inputter.

An electronic data file of image information or the like to be input may be saved in an external storage medium such as a USB memory, the USB memory and the like may be connected to an input interface such as a USB terminal, and a predetermined input operation may be performed through the operation acceptor 12 to read a desired electronic data file saved in the USB memory and the like, and store the electronic data file into the storage 50 as input image data.

The image former, for example, if print data is printed on a recording medium, generally performs processes including charging, exposure, development, transfer, cleaning, electricity removal, and fixing processes in continuation, and forms the print data on the recording medium.

In the development process, toner is supplied from a toner cartridge to a developing device, an electrostatic latent image formed on the surface of a charged photoreceptor drum is developed, and a toner image corresponding to the electrostatic latent image is formed. The toner image formed on the surface of the photoreceptor drum is transferred onto the recording medium by a transfer device, and is then fixed on the recording medium by being heated by a fixing device. The image former converts the input image data into information in a transferable or displayable form.

The image outputter is a component that outputs formed input image data, and corresponds to, for example, a printer.

It is noted that output of input image data is not limited to printing, and includes storing input image data of a scanned document, transmitting, by FAX, input image data of a scanned document, and the like.

For example, output of input image data also includes storing input image data of a read document into an external storage medium such as a USB memory, transmitting input image data to another information processing apparatus or a server via a network such as the Internet, and sorting and saving input image data into a specific save folder (document filing).

The communicator 15 is a component that communicates data with another communication device via a network 2.

Any existing communication lines such as the Internet and other wide area networks (WANs), local area networks (LANs), telephone lines, and dedicated lines may be employed for the network 2.

Any existing form of communication may be employed in a form of connection with the network 2, and a form of communication may be either wired communication or wireless communication.

For example, the multifunction peripheral (MFP) 1 transmits information about an erroneous task to a mobile terminal or the like possessed by a person in charge of management via the network 2.

The image capturer 16 is a camera installed on the image forming apparatus 1, and acquires captured image data 52 by capturing the image forming apparatus 1 itself and a space around the image forming apparatus 1.

In the present disclosure, the image capturer 16 captures particularly a posture, a task status, or the like of a user performing an input operation on the image forming apparatus 1 to execute a desired function, or of a person in charge of management performing a maintenance task such as replacement of the toner cartridge and other components.

At least one camera may be installed on an upper portion of the operation acceptor 12 or the display 13 of the image forming apparatus 1 for the image capturer 16.

It is noted that it is preferable to install a plurality of cameras at positions including the front and both sides of the image forming apparatus 1 to capture a task status of the person in charge of management of the image forming apparatus 1.

Alternatively, the image capturer 16 may not be directly installed on the image forming apparatus 1 to capture a task status and the like of the person in charge of management from all sides, but may be installed on a wall or ceiling around the installation position of the image forming apparatus 1, or at the position of the peripheral equipment.

Image data captured by the image capturer 16 is stored in the storage 50 as captured image data 52.

The task detector 17 is a component that detects an input operation or a task performed by the person in charge of management or the like on the image forming apparatus 1, and particularly, detects an input operation or a task performed on the information processing apparatus when operation explanation information is displayed, and acquires the task or the like as detected task information.

For example, the task detector 17 detects an input operation performed by the person in charge of management or the like using input signals from specific keys of the operation acceptor 12.

In addition, the task detector 17 detects a task performed by the person in charge of management or the like using output signals from a sensor or a switch provided in the image forming apparatus 1.

For example, the task detector 17 detects a task performed by the person in charge of management or the like using output signals from a door opening and closing switch on the front of the image forming apparatus 1, a conveyance detection sensor that monitors a conveyance path of a printing sheet, and a storage detection sensor provided at an installation position of consumable items such as toner cartridges.

When a door on the front of the image forming apparatus 1 is opened by a task worker such as the person in charge of management, a signal indicating that the door is opened is output from the door opening and closing switch, and the task detector 17 detects, by detecting the signal, a task of opening the door having been performed.

The information detected by the task detector 17 is stored in the storage 50 as detected task information 54.

The operation explanation display controller 21 is a component that displays, on the display 13, operation explanation information (an operation guidance) related to a specific task to be performed on the image forming apparatus 1.

In displaying the operation explanation information (operation guidance), characters, symbols, graphics, images, photographs, and the like are used to explain an operation and a task to be performed by the person in charge of management or the like.

For example, when it is time to replace a consumable item of the image forming apparatus 1, operation explanation information (an operation guidance) about a replacement task of the consumable item is displayed.

When some kind of a malfunction such as a sheet conveyance problem occurs in the image forming apparatus 1, the operation explanation information (operation guidance) for resolving such a malfunction is displayed.

When the operation or the task contents to be explained are complicated, the operation explanation information may be displayed using not only text information and still images but also moving images.

It is noted that the operation explanation information (operation guidance) may be output not only as display but also as voice data.

In particular, if the person in charge of management is not nearby, before displaying the operation explanation information (operation guidance), firstly, the voice data may be used to notify a request for replacement of a consumable item, or a fact that a trouble has occurred, or the like.

The image recognizer 22 is a component that performs predetermined image recognition on the captured image data 52 captured by the image capturer 16.

In particular, the image recognizer 22 recognizes the captured image data 52 acquired when operation explanation information 51 is displayed, and acquires the recognized image information related to the operation explanation information displayed on the display 13 from the captured image data.

For example, the image recognizer 22 recognizes a portrait image of a person included in the captured image data 52, then recognizes a posture and a hand movement of the person from the portrait image, and thus, recognizes an operation and task contents on the image forming apparatus 1.

Alternatively, the image recognizer 22 recognizes an object (for example, a box containing a consumable item) included in the captured image data 52, and then recognizes the size of the object, the shape thereof, the color thereof, and character information (a name and a part number of the consumable item) and symbols (a barcode, a two-dimensional code, and the like) provided on the surface of the box.

The information recognized by the image recognizer 22 is stored in the storage 50 as recognized image information 53.

The erroneous task determiner 23 is a component that determines whether an operation, a task, or the like that the person in charge of management or the like intends to perform is an erroneous task.

For example, the erroneous task determiner 23 determines whether an operation or an installation task which the person in charge of management or the like intends to perform on the image forming apparatus 1 for installing a new replacement member such as a consumable item on the image forming apparatus 1 is an incorrect operation.

Alternatively, the erroneous task determiner 23 determines whether a new replacement member such as a consumable item brought by the person in charge of management or the like for replacement is a correct replacement member before the replacement member is installed on the image forming apparatus 1.

The erroneous task determiner 23 determines, if information about the task acquired by the task information acquirer described above differs from contents information of the specific task indicated in the operation explanation information displayed on the display 13, that an erroneous task is performed on the information processing apparatus.

In particular, if the recognized image information 53 acquired by the image recognizer 22 differs from contents information of the specific task indicated in the operation explanation information displayed on the display 13, the erroneous task determiner 23 determines that an erroneous task is performed on the information processing apparatus.

Alternatively, if the detected task information acquired by the task detector 17 differs from contents information of the specific task indicated in the operation explanation information displayed on the display 13, the erroneous task determiner 23 determines that an erroneous task is performed on the information processing apparatus.

Example of a case of determining that an erroneous task is performed include the following case.

When a predetermined function of the information processing apparatus is executed, in a case wherein after a malfunction of the information processing apparatus is detected, a task of resolving the malfunction is performed, the erroneous task determiner 23 determines, if the task of resolving the malfunction is different from the contents information of the specific task indicated in the operation explanation information displayed on the display 13, that an erroneous task is performed on the information processing apparatus.

When, after a need to replace a consumable item installed on the information processing apparatus arises, a task of replacing the consumable item is performed, the erroneous task determiner 23 determines, if the task of replacing the consumable item is different from the contents information of the specific task indicated in the operation explanation information displayed on the display 13, that an erroneous task is performed on the information processing apparatus.

When, after a need to replace a consumable item installed on the information processing apparatus arises, a task of bringing a box containing a new consumable item for replacement to an installation position of the information processing apparatus is performed, the erroneous task determiner 23 determines, if the new consumable item inside the box being not a correct consumable item is detected based on the recognized image information 53 acquired by the image recognizer 22 before the box is unpacked, that an erroneous task is performed on the information processing apparatus.

The determination of whether a task is an erroneous task is made using, for example, operation explanation correspondence information 55 stored in advance in the storage 50 as will be described later.

The erroneous task determiner 23 compares the acquired recognized image information 53 and detected task information 54 with the operation explanation correspondence information 55 to determine whether an erroneous task is performed on the information processing apparatus.

That is, the erroneous task determiner 23 checks whether information obtained from the recognized image information 53 and the detected task information 54 matches or is included in information set in advance in the operation explanation correspondence information 55.

If the information matches or is included, the erroneous task determiner 23 determines the task to be a correct task, else, the erroneous task determiner 23 determines the task to be an erroneous task.

If the task is determined to be an erroneous task, the erroneous task determiner 23 notifies the person in charge of management or the like who intends to perform the erroneous task, either by display or by voice, of a predetermined warning indicating that the task is an erroneous task, and also of a coping method for performing a correct task.

The warning processor 24 is a component that notifies a warning indicating that a task is an erroneous task.

For example, if it is determined that an erroneous task is performed, the warning processor 24 notifies warning information indicating that a task different from the specific task indicated in the operation explanation information displayed on the display 13 is performed.

The warning information is notified by at least one or both of displaying the warning information on the display 13 and outputting the warning information by voice.

The warning processor 24 includes the warning information generator 25 and the warning information notifier 26.

For example, as described above, if the task is determined to be an erroneous task, the warning processor 24 notifies the person in charge of management or the like who intends to perform the erroneous task, either by display or by voice, of a predetermined warning indicating that the task to be performed currently is an erroneous task.

Alternatively, if the member to be replaced is different from the correct replacement member, the warning processor 24 notifies the fact that the member to be replaced is incorrect, either by display or by voice.

The warning information generator 25 is a component that generates the contents of a warning (warning information) to be notified to the person in charge of management or the like.

As described above, if the task is determined to be an erroneous task, it is possible to confirm the contents of the erroneous task and whether the replacement member is incorrect from the detected task information and the image recognition information. Therefore, the warning information generator 25 generates warning information for pointing out that the task to be performed by the person in charge of management or the replacement member is incorrect.

For example, the warning information generator 25 generates the warning information using erroneous task notification setting information 56, which will be described later.

The warning information notifier 26 is a component that notifies warning information generated by the warning information generator 25.

For example, the warning information notifier 26 displays, on the display 13, warning information for pointing out that the task which the person in charge of management or the like intends to perform is incorrect using characters, symbols, graphics, images (still images, moving images), and the like.

The notification is not limited to a display on the display 13, but may be a display by lighting or flashing warning light, buzzing of a warning sound, or output of warning information by voice, or may combine both display and voice.

Depending on a task status and a task location of the person in charge of management or the like, the display on the display 13 may not be seen or may be difficult to be seen, and thus, it may be preferable to output the warning information by voice rather than display.

The coping method processor 27 is a component that notifies a coping method for resolving an erroneous task.

If it is determined by the erroneous task determiner 23 that an erroneous task is performed, the coping method processor 27 notifies coping information for resolving the erroneous task and indicating normal task contents to be performed.

If, after the warning information is notified by the warning processor 24, a person having performed a task on the information processing apparatus performs a predetermined input operation for confirming the coping information indicating the normal task contents, the coping method processor 27 notifies the coping information.

Alternatively, even if a predetermined input operation is not performed, when a fact that a person performing a task on the information processing apparatus is looking at a display screen is recognized by an image, based on the person's posture and the position of the person's head and eyes, the coping information may be automatically displayed on the display 13.

Similar to the notification of warning information, coping information is notified by at least one or both of displaying the coping information on the display 13 and outputting the coping information by voice.

The coping method processor 27 includes the coping information generator 28 and the coping information notifier 29.

For example, if a task is determined to be an erroneous task, the person in charge of management or the like having performed the erroneous task is notified, either by display or by voice, of a fact that the task being performed currently is different from a proper task to be performed, and coping information indicating the correct task contents to be performed.

Alternatively, if a replacement member is different from a correct replacement member, information about the correct replacement member to be replaced is notified by display or by voice.

The coping information generator 28 is a component that generates contents of a coping method (coping information) to be notified to the person in charge of management or the like.

As described above, if a task is determined to be an erroneous task, it is possible to confirm contents of the erroneous task and that a replacement member is incorrect from the detected task information and the image recognition information. Further, if correct task contents to be performed and a correct replacement member can be pointed out, the coping information generator 28 generates coping information for pointing out the correct task contents and the correct replacement member.

For example, the coping information is generated using the erroneous task notification setting information 56, as will be described later.

The coping information notifier 29 is a component that notifies the coping information generated by the coping information generator 28.

For example, the coping information notifier 29 displays, on the display 13, coping information for notifying correct task contents to be performed using characters, symbols, graphics, images (still images, moving images), and the like.

The notification is not limited to a display on the display 13, but may be an output of coping information by voice, or combine both display and voice.

Depending on a task status and a task location of the person in charge of management or the like, the display on the display 13 may not be seen or may be difficult to be seen, and thus, it may be preferable to output the coping information by voice rather than the display.

The storage 50 is a component that stores information and programs necessary for executing each of the functions of the multifunction peripheral MFP according to the present disclosure, and may include a semiconductor storage element such as a ROM, a RAM, and a flash memory, a storage device such as a hard disk drive (HDD) and a solid state drive (SSD), or another storage medium.

The storage 50 stores, for example, the operation explanation information 51, the captured image data 52, the recognized image information 53, the detected task information 54, the operation explanation correspondence information 55, the erroneous task notification setting information 56, notification information 57, and the like.

FIGS. 2 to 7 illustrate diagrams for explaining an example of information stored in the storage 50 of the image forming apparatus 1.

The operation explanation information 51 is information (an operation guidance) for explaining a series of operations and the like to the user or the person in charge of management of the image forming apparatus 1, and is stored in advance in the storage 50.

For example, when the user desires to know about an operation method for executing a desired function, an explanation of the operation method displayed on the display 13 corresponds to the operation explanation information 51.

In replacing consumable items such as toner cartridges, an explanation of a replacement method (a toner cartridge replacement guidance) displayed on the display 13 corresponds to the operation explanation information 51.

Alternatively, if a trouble occurs in conveying a printing sheet, an explanation of a method of removing the jammed sheet (a sheet conveyance error coping guidance) corresponds to the operation explanation information 51.

If the explanation of the operation method or the like includes a plurality of procedures, the operation explanation is described according to the order of the procedures, and the operation explanation is sequentially displayed in the order of the described procedures by a predetermined input operation.

The captured image data 52 is image data captured by the image capturer 16.

The image data may be still images or moving images.

The recognized image information 53 is information recognized by the image recognizer 22.

In the present disclosure, in particular, information necessary for determining an erroneous task is acquired as recognized image information 53 from the captured image data 52.

For example, as described above, the recognized image information 53 includes a portrait image, a person's posture and hand movements, an operation position and task contents on the image forming apparatus 1, an object possessed by a person (for example, a box containing consumable items), an object brought by the person, the size, the shape, and the color of the object, and information (a name, a number, a label color) and symbols (including a barcode, a two-dimensional code, and the like) for identifying the object.

FIG. 2 illustrates a diagram for explaining an example of the recognized image information 53 stored in the storage 50 of the image forming apparatus 1.

In an example, the recognized image information 53 in FIG. 2 includes information recognized as a consumable item image, an operation position image, and a task image.

Examples of the consumable item image acquired from the captured image data include the size (GA01), the shape (GA02), the number (GA03), the label color (GA04), and the like of the box containing the consumable item brought by the person in charge of management.

An example of the operation position image acquired from the captured image data includes an image (GA11) of the front door of the image forming apparatus 1.

Further, an opening and closing status indicating whether the front door is opened or closed may be recognized from the operation position image, and information about the opening and closing status may also be stored as the recognized image information 53.

Examples of the task image recognized from the captured moving images include the posture, the movements, and the like of the person in charge of management, and task contents (GA21) performed by the person in charge of management on the image forming apparatus 1 are recognized from the posture and the like (GA21).

For example, if it is recognized that the person in charge of management is in a sitting posture in front of the image forming apparatus 1 and is performing an operation of opening a predetermined consumable item storage door, it is recognized that the person in charge of management is intending to replace the consumable item. That is, the task is recognized as a consumable item replacement task.

The detected task information 54 is information detected by the task detector 17.

For example, if a sensor for detecting opening and closing of the front door (door opening and closing detection sensor) is installed in the image forming apparatus 1, the information acquired from the sensor is stored.

FIG. 3 illustrates a diagram for explaining an example of the detected task information 54 stored in the storage 50 of the image forming apparatus 1.

For example, if the door opening and closing detection sensor described above, a conveyed sheet detection sensor, a sheet tray detection sensor, and an ink cassette detection sensor are installed on the image forming apparatus 1, information output from each sensor (an ON state or an OFF state) is stored.

The ON state or the OFF state acquired from each sensor can be used to grasp a state of a position where each sensor is installed and an operation status, and therefore, the detected task information 54 is used to determine an erroneous task and an erroneous operation.

The operation explanation correspondence information 55 is information correlating operation explanation information (an operation guidance) displayed on the display 13 with task contents to be performed and image contents to be subjected to image recognition in correspondence to contents of the operation explanation information.

The operation explanation correspondence information 55 is information set in advance by a creator of the operation explanation information 51 or the person in charge of management of the image forming apparatus 1, and for example, information about task contents to be performed and a task position, and information about image contents to be recognized from the captured image data is set and stored in advance for each operation explanation information (operation guidance).

FIG. 4 illustrates a diagram for explaining an example of the operation explanation correspondence information 55 stored in the storage 50 of the image forming apparatus 1.

The operation explanation correspondence information 55 in FIG. 4 indicates information stored by correlating information about a task position and task contents and information about the recognized image for each display screen for an operation explanation.

FIG. 4 illustrates an example of two explanation screens (MG01, MG02) for the display screen for an operation explanation.

The explanation screen MG01 has an operation guidance name of "Ink cassette replacement" and is an explanation screen displayed on the display 13 when an ink cassette is replaced. The explanation screen MG02 has an operation guidance name of "Sheet conveyance error" and is an explanation screen displayed on the display 13 when a jammed sheet is removed in a case of occurrence of a conveyance trouble. When each of the explanation screens (MG01, MG02) is displayed, a task position where a task is to be performed and a recognized image are set in advance in the operation explanation correspondence information 55 in FIG. 4.

For example, when the explanation screen MG01 is displayed, "Front door: Open" indicates that a task position where a task is to be performed is the front door and task contents is an operation of opening the front door.

Further, when the explanation screen MG01 is displayed, the task position of "Ink cassette position" indicates that the task position where the task is to be performed is a position where the ink cassette is stored.

When the explanation screen MG01 is displayed, information about the ink cassette to be replaced (the size: A01, the shape: A02, the number: A03, the label color: A04) is set in advance as the recognized image.

When the explanation screen MG01 is displayed, an image related to an operation method such as a typical method of installing the ink cassette to be replaced is set in advance as the recognized moving image.

Similarly, when the explanation screen MG02 is displayed, "Front door: Open" indicates that a task position where a task is to be performed is a front door and task contents are an operation of opening the front door, and the task position of "Sheet conveyance path" indicates that the task position where the task is to be performed is a path along which a printing sheet is conveyed.

Further, when the explanation screen MG02 is displayed, an image related to the sheet conveyance path of the image forming apparatus 1 is set in advance as the recognized image, and an image related to a typical operation method for removing a sheet is set in advance as the recognized moving image.

Such operation explanation correspondence information 55 is used by the erroneous task determiner 23 to determine whether the task is an erroneous task.

It is checked whether information obtained from the above detected task information and image recognition information matches or is included in the information set in advance in the operation explanation correspondence information 55, and if the information matches or is included, the erroneous task determiner 23 determines that the currently performed task is a correct task, and if not, the erroneous task determiner 23 determines that the currently performed task is an erroneous task.

For example, in a state where the explanation screen MG01 is displayed on the display 13, if the information obtained from the detected task information and the image recognition information can be matched with the task position, the task contents, and the recognized image stored in correspondence with the explanation screen MG01, it is determined that the correct task is performed as the task of "Ink cassette replacement".

That is, if, based on the detected task information and the image recognition information, an operation of opening the front door is performed, and a task of installing an ink cassette matching the information such as the size of the ink cassette to be replaced is recognized at the position where the ink cassette is stored, it is determined that the correct task that can be matched with the task stored in advance in the operation explanation correspondence information 55 corresponding to the explanation screen MG01 is performed.

When a new replacement member such as a consumable item is installed, a replacement member itself brought by the person in charge of management may be incorrect. Therefore, to avoid the replacement member itself from being useless, and prevent an unnecessary task of installing the incorrect replacement member, it is preferable to bring the box containing the replacement member close to the image forming apparatus 1 if possible, before performing the replacement task, and determine whether the replacement member is the correct replacement member before taking out the replacement member from the box.

In this case, when the person in charge of management brings the box containing the replacement member corresponding to the currently displayed operation explanation screen near the image forming apparatus 1, the fact that the box containing the replacement component is brought is recognized, the information about the replacement member described on the side surface or the like of the box is subjected to image recognition, the information about the replacement member (the size, the number, the color label, and the like) stored in advance in the recognized image of the operation explanation correspondence information 55 is compared with the recognized image, and it is determined whether the replacement member that is still inside the box is the correct replacement member.

As a result, if the replacement member brought by the person in charge of management is an incorrect replacement member, it is possible to return the replacement member that is still inside the box to the original storage position before the box is opened. Therefore, it is possible to avoid the replacement member from being useless without damaging the incorrect replacement member itself, and to prevent an unnecessary task of installing an incorrect replacement member.

The erroneous task notification setting information 56 is information including warning information to be notified when an erroneous task is performed on the information processing apparatus, and coping information indicating normal task contents to be performed, and is information stored in advance in the storage 50 and used when warning information to be notified to the person in charge of management or the like or the coping information is generated.

If the erroneous task determiner 23 determines that an erroneous task is performed, the warning information or the coping information corresponding to the task contents determined as the erroneous task is selected from the erroneous task notification setting information 56, and the selected warning information is notified by the warning processor 24, or the selected coping information is notified by the coping method processor 27.

For example, if the erroneous task notification setting information 56 is set in advance for each display screen for an operation explanation displayed on the display 13, and a task or the like determined as an erroneous operation or an erroneous task is performed when the operation explanation is displayed, warning information and coping information to be notified is generated in correlation with the erroneous task or the like, and notified.

FIG. 5 illustrates a diagram for explaining an example of the erroneous task notification setting information 56 stored in the storage 50 of the image forming apparatus 1.

The erroneous task notification setting information 56 in FIG. 5 indicates warning information and coping information stored in correlation with a display screen for an operation explanation, and an erroneous operation or an erroneous task performed when the screen is displayed.

In FIG. 5, for example, if the display screen for an operation explanation is the explanation screen MG01, the erroneous operation or the erroneous task is a task related to ink cassette replacement, and the position of the front door, the installation position of the ink cassette, and the information about the correct ink cassette (the size: A01, the shape: A02, the number: A03, the label color: A04) are correlated and set in advance as the warning information pointing out that the task is an erroneous operation or an erroneous task.

Furthermore, in the case of the explanation screen MG01, the explanation information about the task method and the operation method for the coping method is set as the coping information for the erroneous operation and the erroneous task in advance using characters, graphics, images, and the like.

Similarly, if the display screen for an operation explanation is the explanation screen MG02, the erroneous operation or the erroneous task is the task of resolving a sheet conveyance error, and the position of the front door and the position of the conveyance path to be checked are correlated and set as the warning information pointing out that the task is an erroneous operation or an erroneous task in advance, and the explanation information about the task method and the operation method for the coping method is set as the coping information for the erroneous operation or the erroneous task in advance using characters, graphics, images, and the like.

Further, for example, if it is determined that the task related to ink cassette replacement involves an erroneous task, it is only required that the warning information corresponding to the explanation screen MG01 of the erroneous task notification setting information 56 in FIG. 5 is displayed, and it is not necessary to notify all the warning information including information regarding the position of the front door, the installation position of the ink cassette, and the information about the correct ink cassette.

For example, in the recognized image because of which it is determined that the task is an erroneous task, for example, if a task of intending to open another door at a position different from that of the correct front door is recognized, it is only required that only a warning pointing out that another door at a position different from that of the front door is intended to be opened is notified.

Alternatively, in the recognized image because of which it is determined that the task is an erroneous task, if it is recognized that a box containing a new ink cassette brought by the person in charge of management is not the box containing the correct ink cassette, it is only required that a warning pointing out that the new ink cassette that is brought is not the correct ink cassette is notified.

The contents of the warning information to be notified are determined by the warning information generator 25 using the determination result of the erroneous operation and the contents of the detected task and the recognized image because of which it is determined that the task is an erroneous task.

The notification information 57 is information to be notified to the user and the person in charge of management, and includes the warning information and the coping information.

If only a warning is to be notified to the person in charge of management or the like, the notification information 57 includes the warning information.

Alternatively, if a coping method for an erroneous operation is set in advance, and there is a need to notify the coping method including a case where an input operation for requesting a display of the coping method is performed, the notification information 57 includes the coping information.

Moreover, both the warning information and the coping information may be included in the notification information 57, and the warning information and the coping information may be displayed on the same screen at the same time, for example.

FIGS. 6 and 7 illustrate diagrams for explaining an example of the notification information 57 stored in the storage 50 of the image forming apparatus 1.

The notification information 57 illustrated in FIG. 6 mainly corresponds to warning information, and indicates an example of information displayed on a display screen during a request for replacement of an ink cassette, information displayed on a display screen when a sheet feeding error occurs, and information displayed on a display screen for explaining replacement of consumable items.

Warning information saying "Ink ribbon in ink cassette is empty." is displayed, for example, on the display screen during a request for replacement of the ink cassette (ink cassette replacement request screen) in FIG. 6.

Warning information saying "Sheet conveyance problem has occurred." is displayed, for example, on the display screen when a sheet feeding error occurs (screen during sheet feeding error).

The notification information 57 illustrated in FIG. 7 corresponds to warning information and coping information for replacement of an ink cassette, and indicates an example of warning information and coping information if there is an error in type of a new ink cassette to be replaced, and warning information and coping information if there is a defect in installing the new ink cassette to be replaced.

If there is an error in type of the new ink cassette to be replaced, for example, warning information saying "Type of consumable item to be installed is wrong. Check color and number of consumable item." is displayed on the warning screen during replacement of the ink cassette (ink cassette replacement warning screen) in FIG. 7.

Alternatively, if there is an error in type of the new ink cassette to be replaced, for example, coping information saying "Return wrong consumable item to storage position and prepare following correct consumable item." is displayed on the coping screen during replacement of the ink cassette (ink cassette replacement coping screen) in FIG. 7.

If there is a defect in installing the new ink cassette to be replaced, for example, warning information saying "Installation of consumable item is incomplete. Check installation status of consumable item." is displayed on the warning screen during replacement of the ink cassette (ink cassette replacement warning screen) in FIG. 7.

Alternatively, if there is a defect in installing the new ink cassette to be replaced, for example, coping information saying "Remove consumable item. Align shaft of ink ribbon with groove of ink cassette and press hard with finger until click sounds." is displayed on the coping screen during replacement of the ink cassette (ink cassette replacement coping screen) in FIG. 7.

For the warning information and the coping information described above, not only text information but also image information explaining warnings and coping method may be displayed on the same display screen at the same time.

Alternatively, the contents of the text information may be output by voice.

Examples of Erroneous Task Warning Notification Processing of Image Forming Apparatus Explained below are examples of processing for notifying information about warnings and coping methods (erroneous task warning notification processing) when a task performed by a user, a person in charge of management, or the like is checked for being an erroneous task in a state where predetermined operation explanation information (an operation guidance) is displayed in the image forming apparatus, and it is determined that an erroneous operation is performed.

In the following examples, detection of malfunctions in the image forming apparatus and an erroneous task that may occur during replacement of consumable items and processing of notifying the malfunctions and the erroneous task will be described.

Example 1

Figure 8:
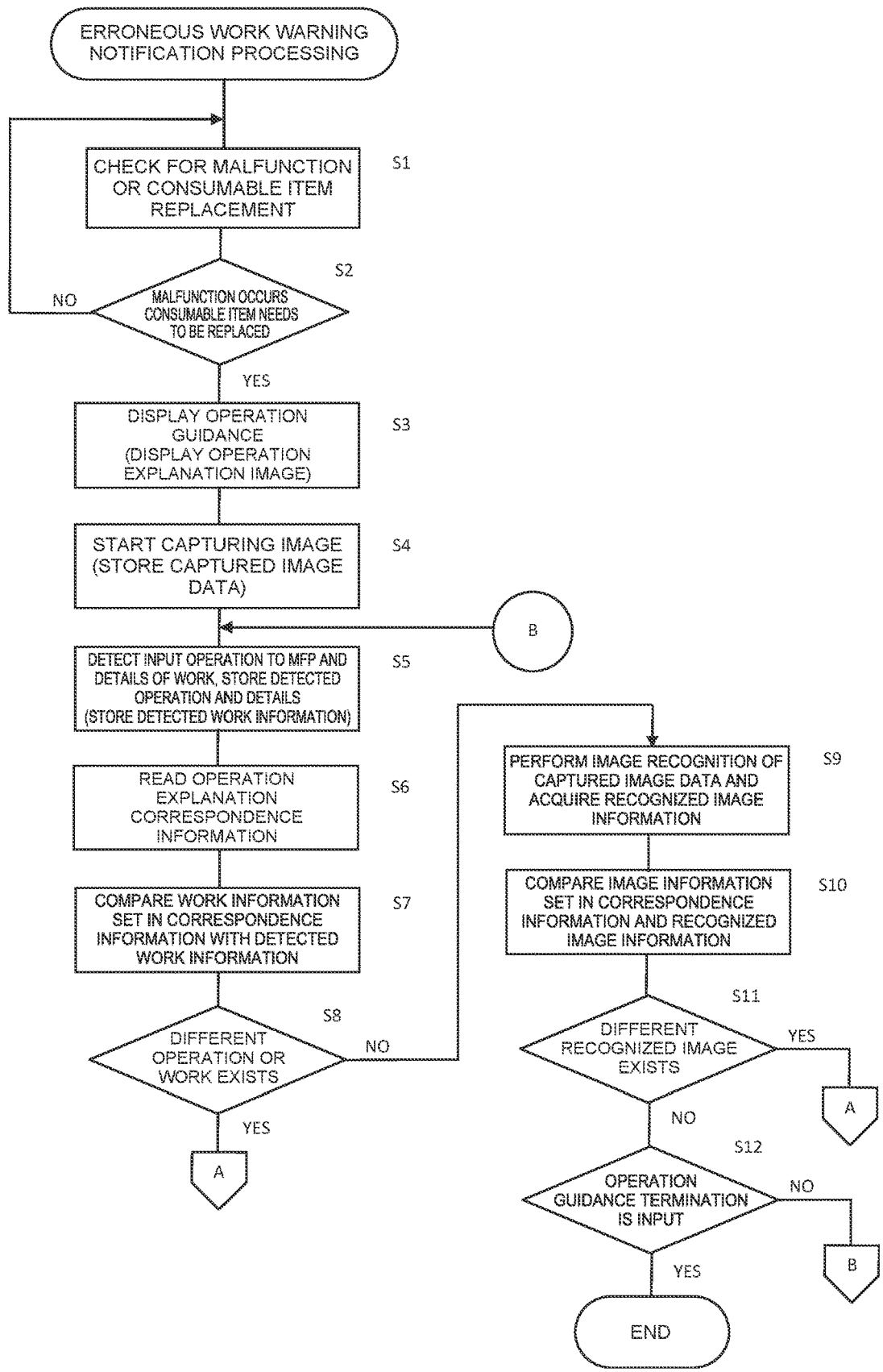
FIG. 8 is a flowchart of an example of erroneous task warning notification processing of the image forming apparatus according to the present disclosure.
Figure 9:
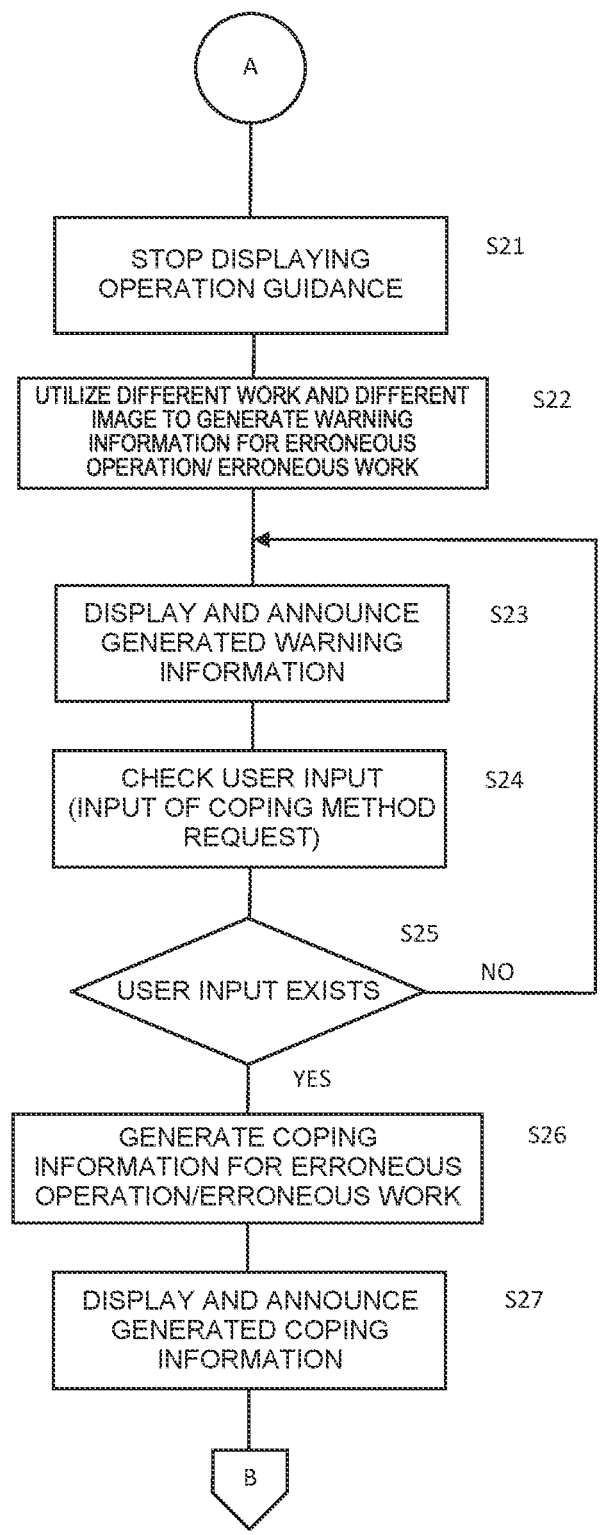
FIG. 9 is a flowchart of an example of erroneous task warning notification processing of the image forming apparatus according to the present disclosure.

FIGS. 8 and 9 illustrate flowcharts of an example of the erroneous task warning notification processing of the image forming apparatus 1.

In step S1 of FIG. 8, it is checked whether a malfunction has occurred in the image forming apparatus 1, or whether the consumable item needs to be replaced.

For example, it is checked whether a printing sheet conveyance problem has occurred by using an output signal from a sensor installed in the sheet conveyance path.

Alternatively, it is checked whether a predetermined period has elapsed since the date when a consumable item was installed.

In step S2, if a malfunction has occurred, or if it is time to replace the consumable item, the processing proceeds to step S3, else the processing returns to step S1.

In step S3, an operation guidance for the malfunction that has occurred or the consumable item to be replaced is displayed on the display 13.

For example, if a printing sheet conveyance problem has occurred, the information about the operation explanation for resolving the printing sheet conveyance problem is read from the operation explanation information (operation guidance) 51 stored in the storage 50, and an operation explanation image is displayed on the display 13.

In addition, to notify the person in charge of management or the like that a malfunction has occurred and that a consumable item needs to be replaced, firstly, warning information indicating that a malfunction has occurred and that a consumable item needs to be replaced is displayed, and then, when the person in charge of management or the like performs a predetermined input operation, the operation guidance may be displayed.

It is noted that the warning information described above indicating that a malfunction has occurred may be sent to a mobile terminal owned by the person in charge of management or the like.

In step S4, image capturing by the image capturer 16 is started, and the captured image data 52 is stored.

In step S5, task contents and an input operation on the image forming apparatus 1 are detected by the task detector 17.

The detected task contents are stored as detected task information 54.

In step S6, the operation explanation correspondence information 55 is read from the storage 50.

Here, the operation explanation correspondence information 55 corresponding to the currently displayed operation explanation information (operation guidance) is read.

In step S7, the erroneous task determiner 23 compares the task information set in the operation explanation correspondence information 55 with the detected task information 54 detected by the task detector 17 to determine whether an erroneous task is performed.

In step S8, if the operation contents or task contents of the detected task information 54 are different from the task information set in the operation explanation correspondence information 55, it is determined that an erroneous task is performed, and the processing proceeds to step S21 in FIG. 9.

On the other hand, if the operation contents or task contents of the detected task information 54 either match or are included in the task information set in the operation explanation correspondence information 55, it is determined that the correct task is performed, and the processing proceeds to step S9.

In step S9, the image recognizer 22 performs image recognition on the captured image data 52, and acquires recognized image information (a person, an object, a task position, operation contents, task contents, and the like) as the recognized image information 53.

In step S10, the erroneous task determiner 23 compares the image information set in the operation explanation correspondence information 55 with the recognized image information 53 acquired by the image recognizer 22 to determine whether an erroneous task is performed.

In step S11, if the operation contents or task contents of the recognized image information 53 are different from the image information set in the operation explanation correspondence information 55, it is determined that an erroneous task is performed, and the processing proceeds to step S21 in FIG. 9.

On the other hand, if the operation contents or task contents of the recognized image information 53 either match or are included in the task information set in the operation explanation correspondence information 55, it is determined that the correct task is performed, and the processing proceeds to step S12.

For the sake of explanation, the determination of the erroneous task by the erroneous task determiner 23 is indicated by dividing into the detected task information 54 and the recognized image information 53 in steps S7 and S10, but the erroneous task may be determined comprehensively using both the detected task information 54 and the recognized image information 53.

For example, if it is determined by both the detected task information 54 and the recognized image information 53 that an erroneous task is performed, it may be determined that an erroneous task is performed and the processing may proceed to step S21 in FIG. 9. If it is determined only from one item of the information that an erroneous task is performed, the task detection by the task detector 17 and the image recognition by the image recognizer 22 may be performed again.

In step S12, it is checked whether an input operation is performed to end the operation guidance. If the input operation is not performed, the processing returns to step S5, and if the input operation is performed, the processing is ended.

Alternatively, if the display image of the operation guidance includes a plurality of images, and an input operation is performed to display the next image or again display a previously displayed image while the operation guidance is displayed, the processing returns to step S3 and an image for the operation guidance corresponding to the input operation is displayed.

Further, if an input operation is performed to end the operation guidance, and the malfunction that has occurred having been resolved or the replacement of the consumable item having ended is detected, the processing may be ended, or may return to step S1.

In step S21 of FIG. 9, it is determined that an erroneous task is performed, so the display of the current operation guidance is stopped.

In step S22, the warning information generator 25 generates warning information regarding an erroneous operation or an erroneous task by using the erroneous task notification setting information 56 and information about a different task and a different image because of which the task is determined to be an erroneous task.

In step S23, the warning information notifier 26 displays the generated warning information on the display 13.

Alternatively, the person in charge of management or the like is notified of the warning information by a method other than display, such as voice.

After confirming the warning information that is displayed or notified by another method, the person in charge of management or the like goes to the installation position of the image forming apparatus 1 and confirms the state of the image forming apparatus 1.

If the person in charge of management or the like understands the contents of the warning information and can resolve the malfunction, or can replace a consumable item, it is only required that the person in charge of management or the like takes a necessary measures.

However, if the person in charge of management or the like understands the contents of the warning information but is not aware of the coping method for resolving the warning contents, or is aware of the coping method but desires to confirm the coping method, an input operation for displaying the coping method may be performed.

In step S24, it is checked whether an input operation for requesting to display a coping method is performed.

In step S25, if the person in charge of management or the like performs an input operation for requesting to display the coping method, the processing proceeds to step S26, else the processing returns to step S23.

In step S26, the coping information generator 28 generates coping information for an erroneous operation or an erroneous task by using the erroneous task notification setting information 56 and the information about a different task and a different image because of which the task was determined to be an erroneous task.

In step S27, the coping information notifier 29 displays the generated coping information on the display 13.

Alternatively, the person in charge of management or the like is notified of the coping information by a method different from display, such as voice.

Thereafter, the processing proceeds to step S5.

If the display image of the operation guidance includes a plurality of images, and an input operation is performed to display the next image or again display a previously displayed image while the operation guidance is displayed, the processing returns to step S3 instead of step S5, and an image of the operation guidance corresponding to the input operation may be displayed.

Further, if an input operation is performed to end the operation guidance, and the malfunction that has occurred having been resolved or the replacement of the consumable item having ended is detected, the processing may be ended, or may return to step S1.

As described above, during the replacement task of consumable items or the like and the task of responding to problems in the apparatus or replacing components, the information acquired by the detection of a task on the image forming apparatus 1 and image recognition is used to determine that an erroneous operation or an erroneous task is performed. Therefore, an incorrect task can be detected at the earliest possible stage during the replacement task or the like so that the person in charge of management or the like can be warned about the contents of the erroneous task and be notified of a coping method for resolving the erroneous task or the like.

In addition, by warning about the contents of the erroneous task and notifying the coping method, it is possible to avoid the replacement member or the like from being useless, prevent an unnecessary task by the person in charge of management, and reduce the workload on the person in charge of management.

Example 2

The Example 1 described above describes an example where the coping information is displayed if, after the notification of warning information by a display or the like, an input operation is performed by the person in charge of management.

However, even if an input operation is not performed by the person in charge of management, for example, after a certain period of time has elapsed, the coping information may be displayed. Alternatively, if some of the contents of the warning information and the coping information are duplicated, the warning information and the coping information may be displayed at the same time on the same screen.

In addition, if a state is detected by image recognition or the like in which the person in charge of management or the like has come just in front of the installation position of the image forming apparatus 1 while the warning information is displayed, the coping information may be displayed after a certain period of time has elapsed.

Example 3

In the above-described examples, image recognition is used to recognize information such as the size and number of the replacement member.

However, depending on a position where the replacement member brought by the person in charge of management is placed, the replacement member may not be captured by the camera, or it may be difficult to perform image recognition for the information about the replacement member.

Information such as a text written on a storage box containing the replacement member is too small to recognize an image of the information.

Therefore, in the image recognition processing, if the information about the replacement member cannot be recognized, the person in charge of management is notified by display or by voice that the image recognition cannot be performed, and furthermore, to ensure the acquisition of information about the replacement member by performing image recognition again, a screen for requesting that the replacement member be placed at a predetermined position may be displayed or notified by voice.

The predetermined position is a position where information such as the text written on the storage box can be captured and recognized, and is, for example, a position at the top of the casing of the image forming apparatus 1 or right in front of the camera, or in the front or on the sides of the image forming apparatus 1.

When the person in charge of management confirms that the replacement member has been placed at the predetermined position, image recognition may be performed again to obtain information about the replacement member.

Examples of Processing of Notifying Warning and Coping Method when Erroneous Task is Detected A specific example of processing of notifying an erroneous task or the like will be described below with reference to examples of screens displaying the warning information and the coping information.

Example 1 of Notification Processing

Here, a specific example of the contents of notifications displayed in replacing the ink cassette being a consumable item will be described.

When the ink cassette is replaced, it is assumed that a replacement member for the ink cassette brought by the person in charge of management is incorrect.

FIG. 10 illustrates an example of a screen for requesting replacement of the ink cassette being a consumable item (consumable item replacement request screen: G1).

For example, when a state is detected where an ink ribbon installed in the ink cassette is empty, the consumable item replacement request screen G1 is displayed.

Text information saying "Ink ribbon in ink cassette is empty. See explanation image to replace consumable item (ink cassette)." is displayed on the consumable item replacement request screen G1 in FIG. 10.

Furthermore, a selection display area is displayed for selecting whether to show or not show the explanation image.

When the person in charge of management sees the screen G1, the person in charge of management determines whether or not to show the explanation image for replacement of the ink cassette.

If the explanation image for replacement of the ink cassette is to be shown, it is only required that the person in charge of management performs an input operation to select the display area of "Show explanation image".

On the other hand, if the explanation image for replacement of the ink cassette is not to be shown, it is only required that the person in charge of management performs an input operation to select the display area of "Don't show explanation image."

When an input operation is performed to select the display area of "Show explanation image", an explanation screen (operation guidance) for replacement of the ink cassette is displayed.

When the operation guidance includes a plurality of explanation images, the explanation images are displayed sequentially in accordance with a predetermined operation order.

Figure 12:
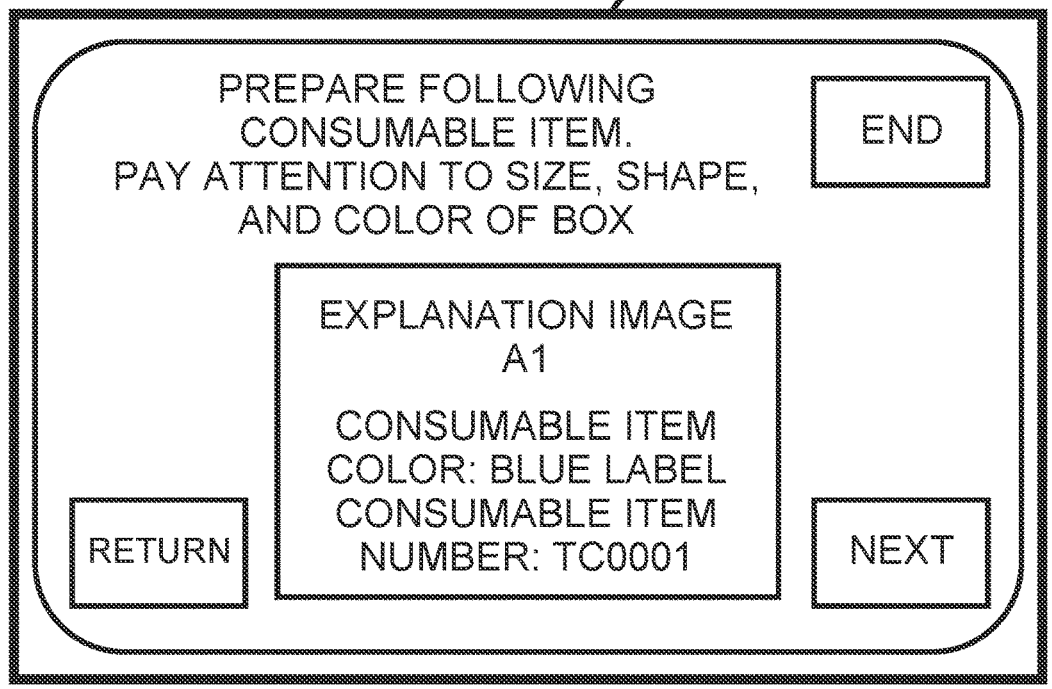
FIG. 12 is a diagram for explaining an example of a screen displayed on a display of the image forming apparatus according to the present disclosure.

FIG. 12 illustrates an example of a screen for explaining replacement of the ink cassette being a consumable item (consumable item replacement explanation screen: G3).

The consumable item replacement explanation screen G3 corresponds to the explanation image of the operation guidance that is displayed firstly when an input operation is performed to select the display area of "Show explanation image" on the screen G1.

Text information saying "Prepare following consumable item. Pay attention to size, shape, and color of box." and an explanation image A1 corresponding to the text information are displayed on the consumable item replacement explanation screen G3 in FIG. 12.

In the explanation image A1, for example, a photographic image of a box containing the consumable item is displayed from which it is understood that the label color of the consumable item is blue and the consumable item number is "TCO0001".

The text information displayed on the screen G3 is not limited to the above contents, and for example, clear text information that prevents the person in charge of management from bringing an incorrect box, such as "Pay attention to type of consumable item and label color. Bring a box with consumable item label color and consumable number displayed in following explanation image A1." may be displayed.

Further, on the screen G3 in FIG. 12, a display area for proceeding to the explanation image on the next page in the operation guidance, a display area for returning to the explanation image on the previous page, and a display area for ending the operation guidance are displayed.

On the screen G3 in FIG. 12, "Next" is the display area for proceeding to the explanation image on the next page of the operation guidance, "Return" is the display area for returning to the explanation image on the previous page of the operation guidance, and "End" is the display area for ending the operation guidance.

For example, if the operation guidance includes a plurality of explanation images, selecting the "Next" display area causes the explanation image on the next page to be displayed.

It is assumed that the person in charge of management who views the screen G3 in FIG. 12 takes the box containing the consumable item displayed in the explanation image A1, brings the box containing the consumable item close to the image forming apparatus 1, and places the box at a position where the box can be captured by the camera.

At this time, an image of the box is captured by the camera, the captured image data of the box is acquired, and the image is recognized.

If, for example, information about the consumable item (the size, the shape, the number, the color, and the like of the ink cassette) is written on the side of the box, the information about the consumable item (such as the size of the ink cassette) is acquired as the recognized image information 53 by performing image recognition of the image of the box.

Thereafter, the recognized image information 53 acquired by image recognition is compared with the operation explanation correspondence information 55 for which the operation guidance name corresponds to "Ink cassette replacement" as illustrated in FIG. 4.

If, in the comparison of the recognized image information 53 with the operation explanation correspondence information 55, the information about the consumable item (ink cassette) match each other, it is determined that the correct consumable item (ink cassette) has been brought.

On the other hand, if, in the comparison of the recognized image information 53 with the operation explanation correspondence information 55, the information about the consumable item (ink cassette) does not match each other, it is determined that the box (consumable item) brought by the person in charge of management is incorrect, and that an erroneous task is performed.

If the task is determined to be an erroneous task, the display of the operation guidance is temporarily stopped, and the warning information and the coping information are displayed.

Figure 13:
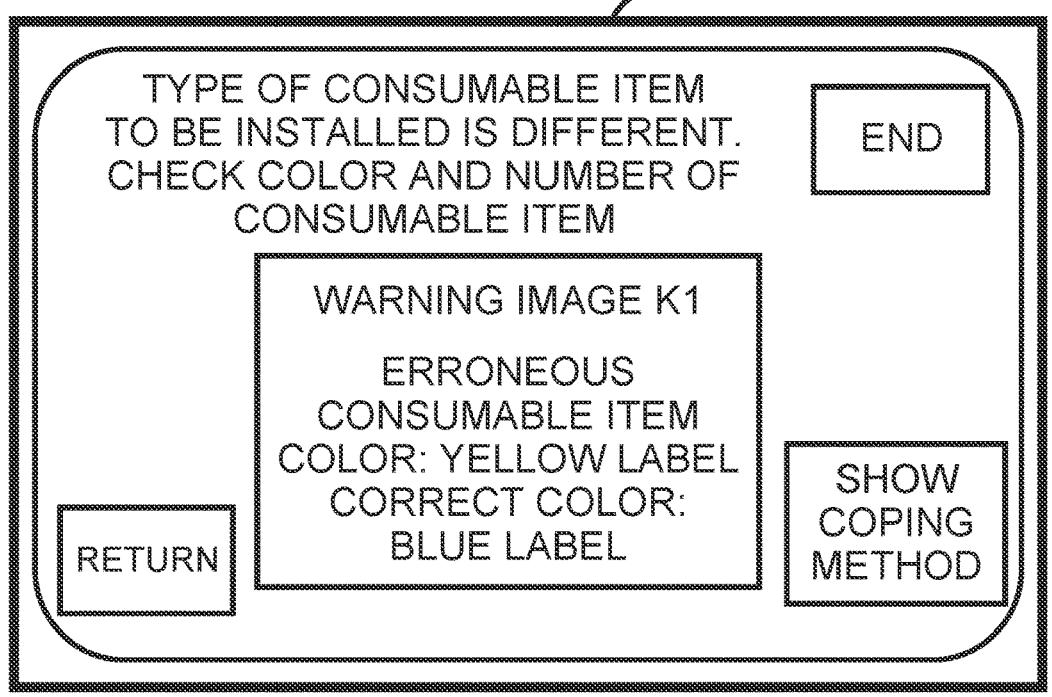
FIG. 13 is a diagram for explaining an example of a screen displayed on a display of the image forming apparatus according to the present disclosure.

If the task is determined to be an erroneous task, for example, warning information is generated to notify that the brought consumable item (ink cassette) is incorrect, and a warning screen as illustrated in FIG. 13 is displayed.

FIG. 13 illustrates an example of a warning information screen (consumable item replacement warning screen: G4) displayed when an erroneous task occurs during the replacement of an ink cassette being a consumable item.

Text information saying "Type of consumable item to be installed is wrong. Check color and number of consumable item." and a warning image K1 are displayed on the consumable item replacement warning screen G4 in FIG. 13.

The warning image K1, for example, along with a photograph of the box containing the correct consumable item that should have been brought, includes the fact that the label color of the consumable item (yellow label) in the box that is currently brought is incorrect, and that the label color of the correct consumable item is blue.

In addition, a selection display area saying "Show coping method" is displayed on the consumable item replacement warning screen G4 in FIG. 13.

On seeing the warning screen G4 in FIG. 13, the person in charge of management would find the fact that the brought consumable item is incorrect, and if the person in charge of management further desires to know about the coping method, it is only required that the person in charge of management performs an input operation to select the display area of "Show coping method".

Figure 14:
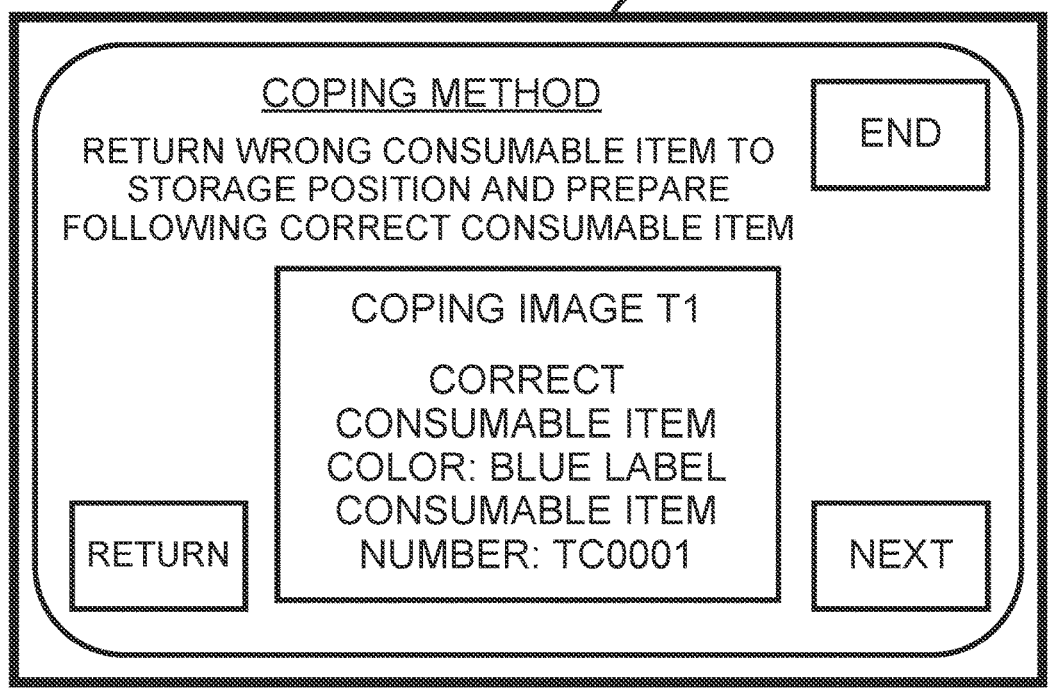
FIG. 14 is a diagram for explaining an example of a screen displayed on a display of the image forming apparatus according to the present disclosure.

When the person in charge of management performs an input operation to select the display area of "Show coping method", for example, a screen as illustrated in FIG. 14 is displayed.

For the sake of explanation, the screen G4 in FIG. 13 indicates a screen displaying only the warning information, but along with the warning information, the contents of the coping information, which will be described later, may also be displayed on the same screen.

FIG. 14 illustrates an example of a screen for explaining a coping method (consumable item replacement coping screen: G5) displayed when an erroneous task occurs during the replacement of an ink cassette being a consumable item.

Text information saying "Return wrong consumable item to storage position and prepare following correct consumable item." and a coping image T1 are displayed on the consumable item replacement coping screen G5 in FIG. 14.

In the coping image T1, for example, along with a photograph of the box containing the correct consumable item that should have been brought, the label of the correct consumable item (blue label), and the number of the correct consumable item (TC00001) are displayed.

The person in charge of management can more reliably bring the correct consumable item (ink cassette) by checking the consumable item replacement coping screen G5 in FIG. 14.

Thereafter, if the person in charge of management brings the correct consumable item (ink cassette), the person in charge of management may end the display of the screen G5 by entering selection of the "End" area displayed on the coping screen G5 in FIG. 14, and resume the temporarily stopped display of the operation guidance for "Ink cassette replacement".

Alternatively, when the person in charge of management brings the box containing the correct consumable item (ink cassette), similarly, an image of the box may be captured, the recognized image information 53 may be acquired by performing image recognition on the captured image data, the recognized image information 53 and the operation explanation correspondence information 55 may be compared, and if the information about the consumable item (ink cassette) matches each other, it may be determined that the correct consumable item (ink cassette) is brought, and the screen may be automatically returned to the stopped display of the operation guidance for "Ink cassette replacement".

Example 2 of Notification Processing

Here again, a specific example of the notification contents displayed during the replacement of the ink cassette being a consumable item will be described. An example of a display screen when a method of installing the ink cassette is incorrect during the ink cassette replacement task will be described.

As described in Example 1, it is assumed that the person in charge of management views the warning screen and the coping screen and brings a box containing the correct consumable item (ink cassette) to be replaced.

The person in charge of management opens the box, takes out the correct consumable item (ink cassette) from the box, takes out an old consumable item (ink cassette) from the ink cassette installation position of the image forming apparatus 1, and installs a new consumable item (ink cassette).

Figure 15:
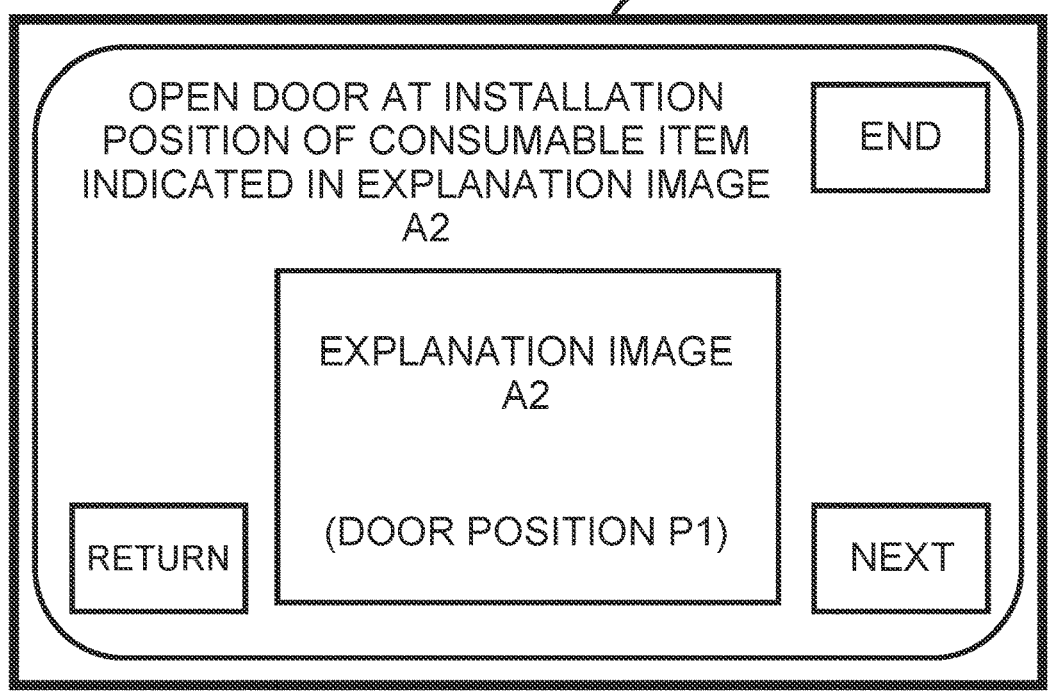
FIG. 15 is a diagram for explaining an example of a screen displayed on a display of the image forming apparatus according to the present disclosure.

FIG. 15 illustrates an example of a screen for explaining replacement of the ink cassette being a consumable item (consumable item replacement explanation screen: G6).

It is assumed that the consumable item replacement explanation screen G6 in FIG. 15 is displayed when the person in charge of management enters selection of the "Next" display area of the explanation screen (operation guidance).

Text information saying "Open door at installation position of consumable item indicated in explanation image A2", and the explanation image A2 are displayed, for example, on the consumable item replacement explanation screen G6 in FIG. 15.

In the explanation image A2, a position P1 of the door at the installation position of the consumable item indicated in the text information is displayed.

The position P1 of the door is displayed using a photograph or the like of the image forming apparatus 1 so that the position P1 can be known in the image forming apparatus 1.

It is only required that the person in charge of management checks the explanation screen G6 and opens the door at the installation position indicated in the explanation image A2.

Figure 16:
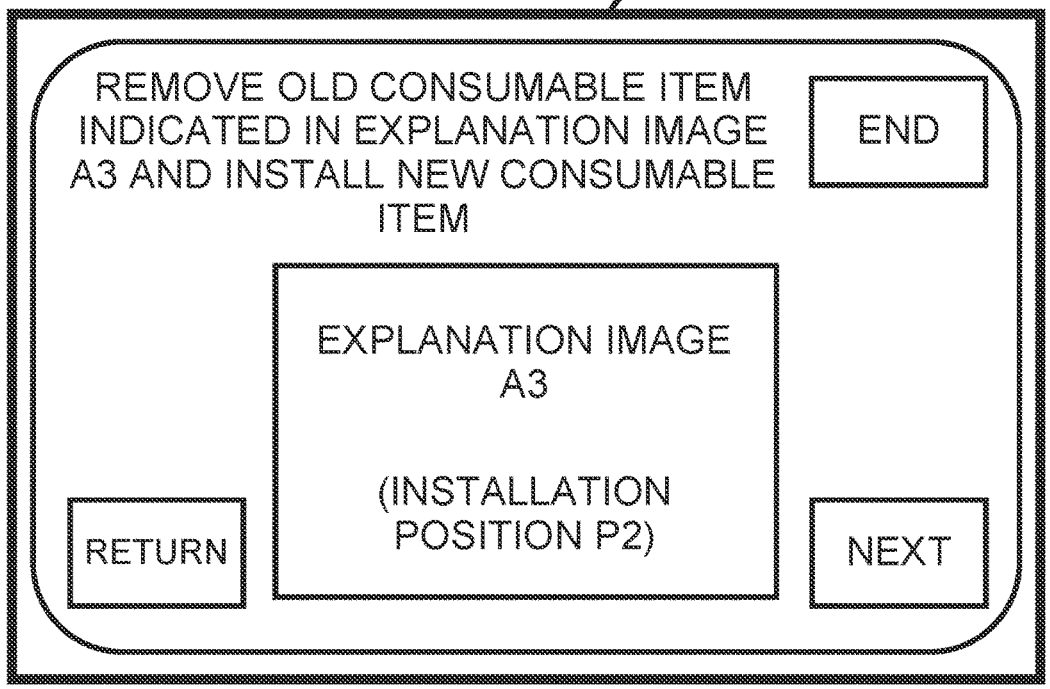
FIG. 16 is a diagram for explaining an example of a screen displayed on a display of the image forming apparatus according to the present disclosure.

The explanation screen G7 illustrated in FIG. 16 is displayed when the person in charge of management enters selection of the "Next" display area of the explanation screen G6 after opening the door at the installation position.

FIG. 16 illustrates an example of a screen for explaining replacement of the ink cassette being a consumable item (consumable item replacement explanation screen: G7).

The contents of the operation to be performed next are displayed on the explanation screen G7.

Text information saying "Remove old consumable item indicated in explanation image A3 and install new consumable item" and the explanation image A3 are displayed, for example, on the explanation screen G7 in FIG. 16.

The installation position P2 of the consumable item (ink cassette) indicated in the text information is displayed in the explanation image A3.

On seeing the explanation screen G7, the person in charge of management understands the installation position of the consumable item (ink cassette), and thus, the person in charge of management removes the old consumable item with reference to the explanation image A3.

After removing the old consumable item, the person in charge of management performs a task of installing the new consumable item (ink cassette) taken out of the box at the installation position P2.

Here, if the person in charge of management is aware of the installation position P2 of the consumable item (ink cassette) but desires to confirm the installing method, the person in charge of management enters selection of the display area of "Next" on the explanation screen G7.

Figure 17:
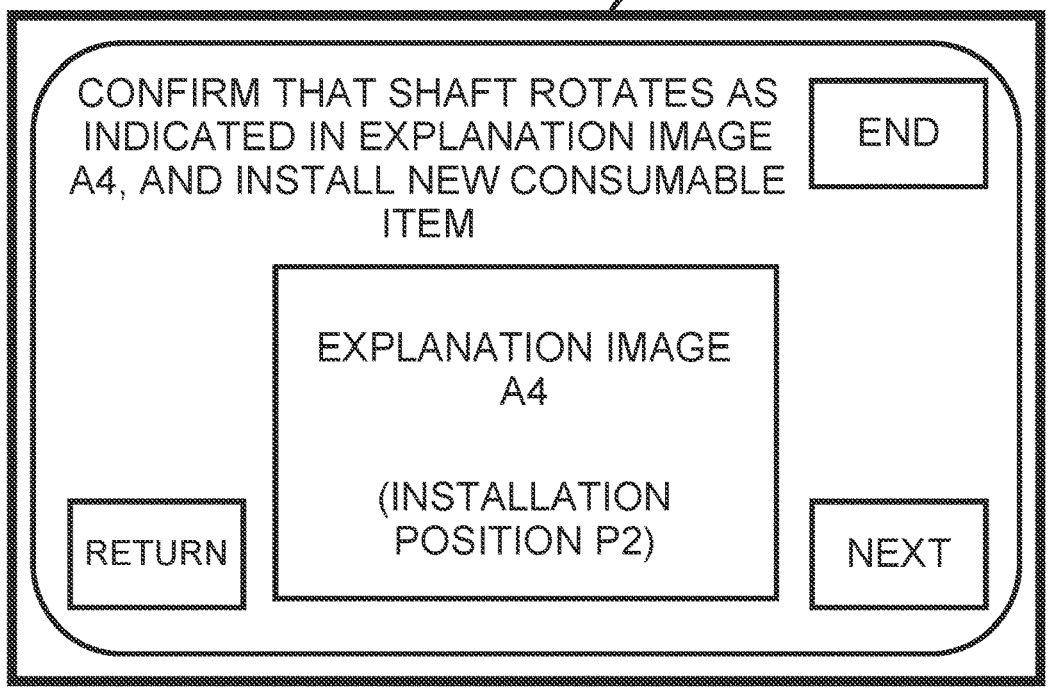
FIG. 17 is a diagram for explaining an example of a screen displayed on a display of the image forming apparatus according to the present disclosure.

By entering the selection, an explanation screen G8 as illustrated in FIG. 17 is displayed.

FIG. 17 illustrates an example of a screen for explaining replacement of the ink cassette being a consumable item (consumable item replacement explanation screen: G8).

The explanation screen G8 displays the operation contents about the method of installing the consumable item (ink cassette).

Text information saying "Confirm that shaft rotates as indicated in explanation image A4 and install new consumable item" and the explanation image A4 are displayed, for example, on the explanation screen G8 in FIG. 17.

The installation position P2 of the consumable item (ink cassette) indicated in the text information and an image for the installing method (for example, a moving image) are displayed in the explanation image A4.

On seeing the explanation screen G8, the person in charge of management understands the method of installing the consumable item (ink cassette), and thus, the person in charge of management installs the new consumable item (ink cassette) with reference to the explanation image A4.

During installing the consumable item (ink cassette), for example, it is necessary to fit the new consumable item into a predetermined position, and in the case of correctly fitting the new consumable item, a click sound is heard and a predetermined detection switch is pressed, and as a result of pressing of the detection switch, a installing detection signal is output from the detection switch.

If a state is detected where the installing detection signal is output, it is determined that the consumable item (ink cassette) is correctly installed.

On the other hand, for example, if the output of the installing detection signal is not detected even after a predetermined period of time has elapsed, it is determined that the consumable item (ink cassette) is not installed correctly and that the task is an erroneous task.

If the task is determined to be an erroneous task, the display of the operation guidance is temporarily stopped, and the warning information and the coping information are displayed.

Figure 18:
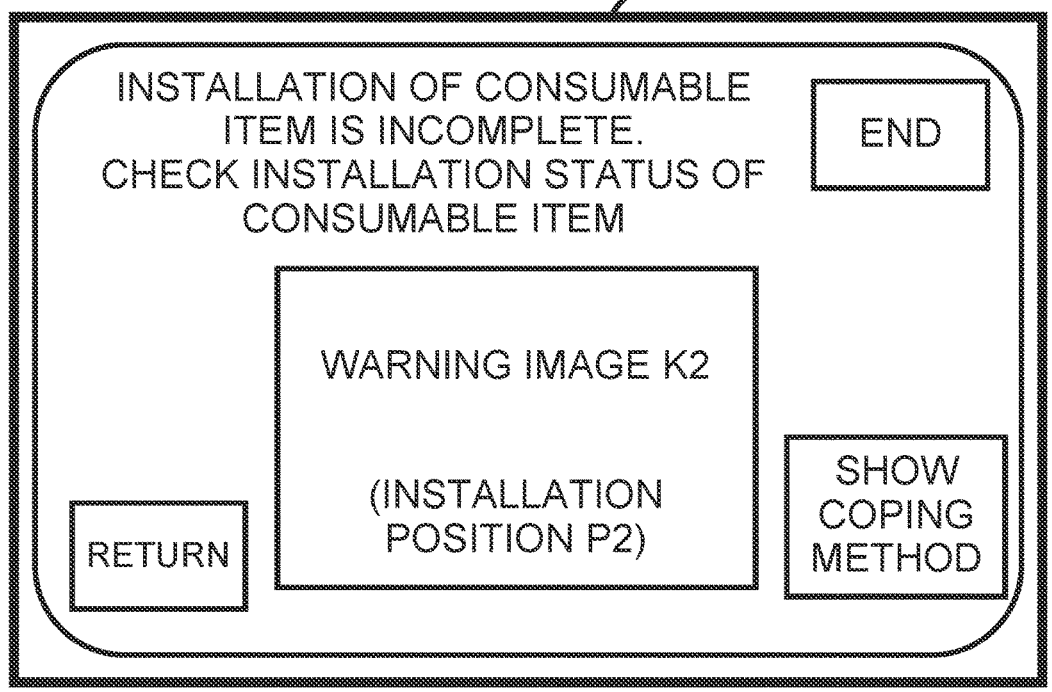
FIG. 18 is a diagram for explaining an example of a screen displayed on a display of the image forming apparatus according to the present disclosure.

If the task is determined to be an erroneous task, for example, warning information is generated to notify that the installed consumable item (ink cassette) is not installed correctly, for example, and a warning screen as in FIG. 18 is displayed.

FIG. 18 illustrates an example of a warning information screen (consumable item replacement warning screen: G9) displayed when an erroneous task occurs during the replacement of an ink cassette being a consumable item.

Text information saying "Installation of consumable item is incomplete. Check installation status of consumable item." and a warning image K2 are displayed on the consumable item replacement warning screen G9 in FIG. 18.

The warning image K2 includes, for example, the installation position P2 of the consumable item and graphics or the like of the consumable item in an incomplete installation state.

In addition, a selection display area saying "Show coping method" is displayed on the consumable item replacement warning screen G9 in FIG. 18.

On seeing the warning screen G9 in FIG. 18, the person in charge of management would find the fact that the installation state of the consumable item is incorrect, and, if the person in charge of management further desires to know about the coping method, it is only required that the person in charge of management performs an input operation to select the display area of "Show coping method".

Figure 19:
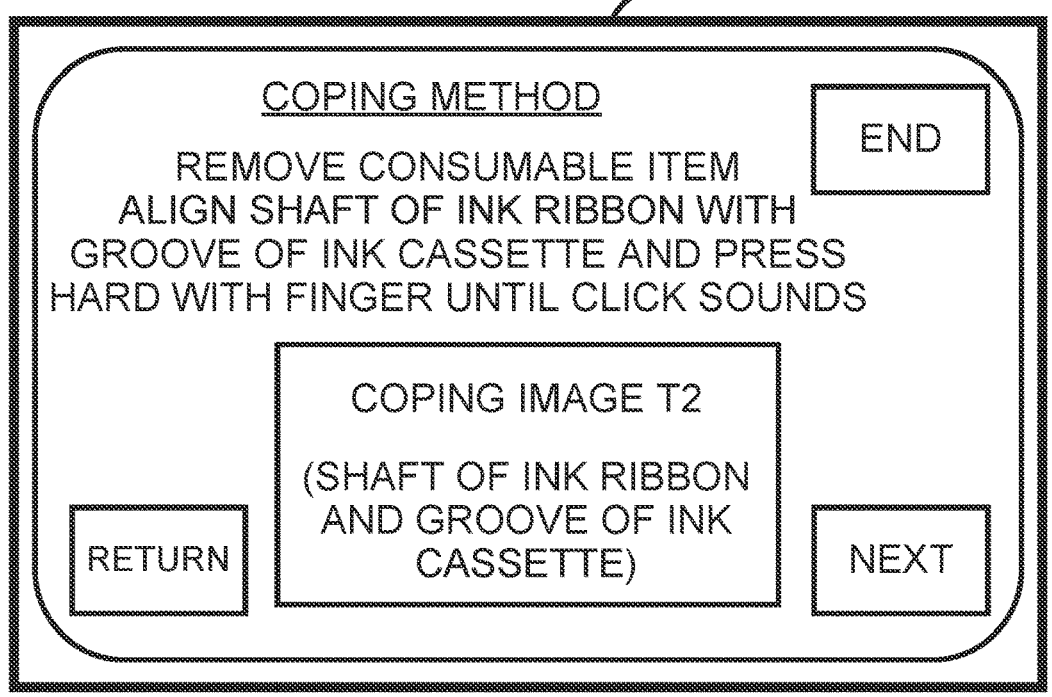
FIG. 19 is a diagram for explaining an example of a screen displayed on a display of the image forming apparatus according to the present disclosure.

When the person in charge of management performs an input operation to select the display area of "Show coping method", for example, a screen as illustrated in FIG. 19 is displayed.

For the sake of explanation, the warning screen G9 in FIG. 18 indicates a screen displaying only the warning information, but along with the warning information, the contents of the coping information, which will be described later, may also be displayed on the same screen.

FIG. 19 illustrates an example of a screen for explaining a coping method (consumable item replacement coping screen: G10) displayed when an erroneous task occurs during the replacement of an ink cassette being a consumable item.

Text information saying "Remove consumable item. Align shaft of ink ribbon with groove of ink cassette and press hard with finger until click sounds." and a coping image T2 are displayed on the consumable item replacement coping screen G10 in FIG. 19.

In the coping image T2, for example, the shaft of the ink ribbon and the groove of the ink cassette are displayed, and an image (for example, a moving image) showing that the shaft and the groove are aligned and pressed with a finger is displayed.

By checking the consumable item replacement coping screen G10 in FIG. 19, the person in charge of management can more reliably install the consumable item (ink cassette) correctly.

Thereafter, the person in charge of management may end the display of the screen G5 by entering selection of the "End" area displayed on the coping screen G10 in FIG. 19, may resume the temporarily stopped display of the operation guidance for "Ink cassette replacement", or else, may end the display of the operation guidance since installation of the consumable item (ink cassette) is ended.

Alternatively, when the shaft of the ink ribbon and the groove of the ink cassette are aligned and pressed with a finger until a click sound is heard, and the consumable item (ink cassette) is installed correctly, the detection switch described above is pressed and an installing detection signal is output from the detection switch.

If a state is detected where the installing detection signal is output, it is determined that the consumable item (ink cassette) is installed correctly, and thus, the stopped display of the operation guidance for "Ink cassette replacement" may be automatically ended.

Example 3 of Notification Processing

Here, for example, a specific example of notification contents displayed when the printing process is interrupted (when a sheet feeding error occurs) due to a problem with feeding or conveyance of printing sheets during the printing function will be described.

When a sheet feeding error occurs, for example, first of all, warning information indicating the occurrence of a sheet feeding or conveyance problem is displayed, following which an explanation screen (operation guidance) for removing the jammed sheet is displayed, and if an erroneous task occurs during the sheet removal task, a warning screen is displayed, and further, a coping screen indicating a coping method for removing the sheet is displayed.

FIG. 11 illustrates an example of a screen displayed during the occurrence of a sheet feeding error (screen during sheet feeding error: G2).

As described above, if a state is detected where a sheet feeding error has occurred, the screen during sheet feeding error G2 is displayed.

Text information saying "Sheet conveyance problem has occurred. See explanation image to remove sheet." is displayed on the screen during sheet feeding error G2 in FIG. 11.

Furthermore, a selection display area is displayed for selecting whether to show or not show the explanation image.

When the person in charge of management sees the screen G2, the person in charge of management determines whether or not to show the explanation image for sheet removal.

If the explanation image for the sheet removal is to be shown, it is only required that the person in charge of management performs an input operation to select the display area of "Show explanation image".

On the other hand, if the explanation image for the sheet removal is not to be shown, it is only required that the person in charge of management performs an input operation to select the display area of "Don't show explanation image".

When an input operation is performed to select the display area of "Show explanation image", an explanation screen for sheet removal (operation guidance for "sheet conveyance error") is displayed.

When the operation guidance includes a plurality of explanation images, the explanation images are displayed sequentially in accordance with a predetermined operation order.

Figure 20:
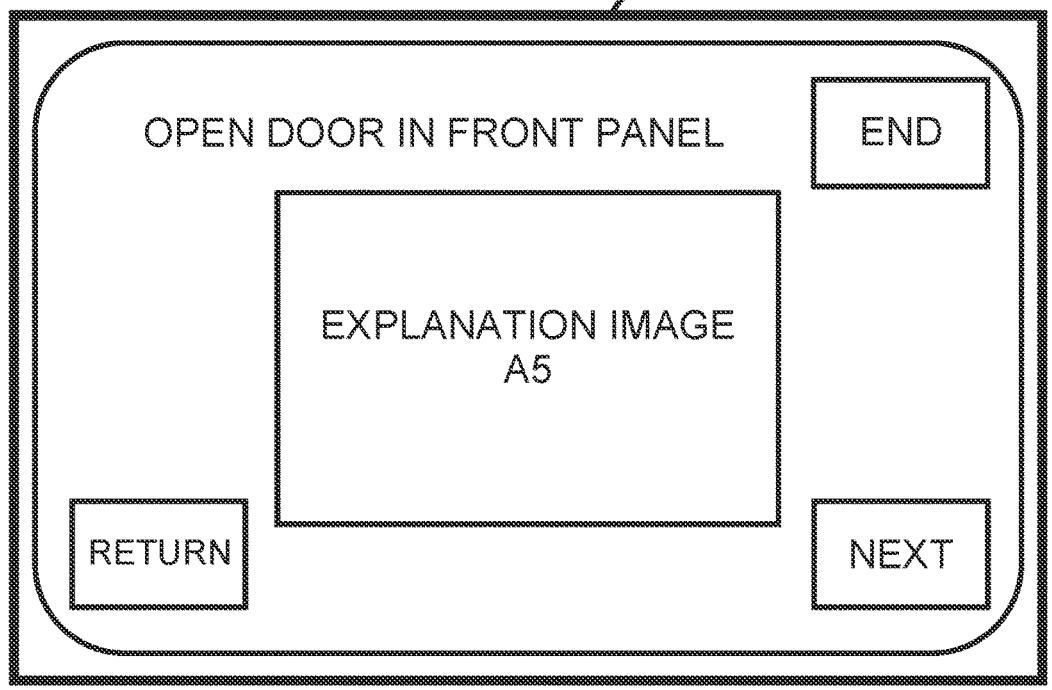
FIG. 20 is a diagram for explaining an example of a screen displayed on a display of the image forming apparatus according to the present disclosure.

FIG. 20 illustrates an example of a screen for explaining sheet removal (sheet removal explanation screen: G11).

The sheet removal explanation screen G11 corresponds to an explanation image of the operation guidance displayed first when an input operation to select the display area of "Show explanation image" is performed on the screen G2.

Text information saying "Open door in front panel" and an explanation image A5 corresponding to the text information are displayed on the sheet removal explanation screen G11 in FIG. 20.

The explanation image A5 includes, for example, a photographic image for understanding the position of the door on the front panel of the image forming apparatus 1.

Further, a display area "Next" for proceeding to the explanation image on the next page of the operation guidance, a display area "Return" for returning to the explanation image on the previous page, and a display area "End" for ending the operation guidance are displayed on the screen G11 in FIG. 20.

For example, if the operation guidance includes a plurality of explanation images, selecting the "Next" display area causes the explanation image on the next page to be displayed.

When the sheet removal explanation screen G11 illustrated in FIG. 20 is displayed, it is assumed that the person in charge of management performs an operation to open the door on the front panel.

After opening the door of the front panel, if the person in charge of management desires to check the next task contents, it is only required that the person in charge of management selects the "Next" display area on the screen G11. It is assumed that if the "Next" display area is selected, an explanation image on the next page as illustrated in FIG. 21 is displayed.

Figure 21:
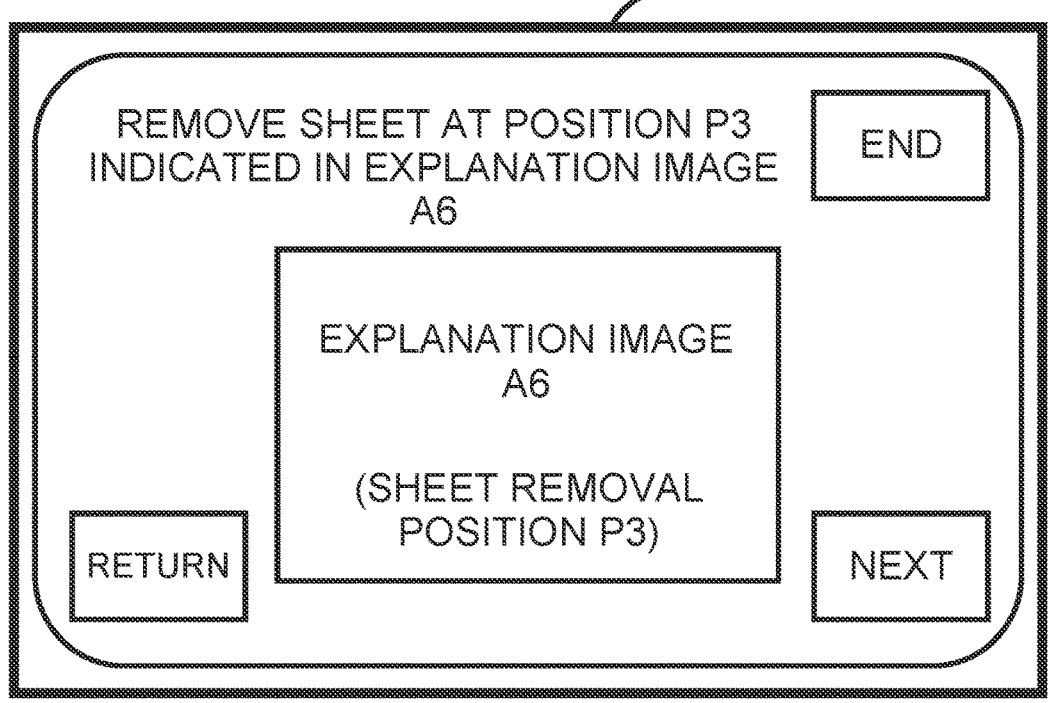
FIG. 21 is a diagram for explaining an example of a screen displayed on a display of the image forming apparatus according to the present disclosure.

FIG. 21 illustrates an example of a screen for explaining an operation method for sheet removal (sheet removal explanation screen: G12) during the occurrence of a sheet feeding error.

Text information saying "Remove sheet at position P3 indicated in explanation image A6" and the explanation image A6 corresponding to the text information are displayed on the sheet removal explanation screen G12 in FIG. 21.

The explanation image A6 includes, for example, a photograph of a state where the door of the front panel of the image forming apparatus 1 is opened, and an image for understanding the sheet removal position P3.

After checking the sheet removal explanation screen G12 in FIG. 21, the person in charge of management performs a task of removing a sheet stuck at the sheet removal position P3 with reference to the explanation screen G12.

The complete sheet removal stuck at the sheet removal position P3 can be determined, for example, by detecting a signal output from a conveyed sheet detection sensor that monitors the sheet conveyance path.

If the signal output from the conveyed sheet detection sensor indicates that the sheet has been removed, it means that the sheet removal task is performed normally, and therefore, the display of the operation guidance for the "Sheet conveyance error" may be automatically ended.

However, while the explanation screen G12 is displayed, for example, if the signal indicating that the sheet has been removed is not detected from the conveyed sheet detection sensor even after a predetermined period of time has elapsed, the sheet has not yet been removed, and thus, it can be determined that an erroneous task has occurred during the removal of the jammed sheet.

Alternatively, if another sheet remains at the sheet removal position P3, or if a part of the sheet has been removed but a part of the sheet still remains in the conveyance path, it is determined that an erroneous task has occurred during the removal of the jammed sheet.

Figure 22:
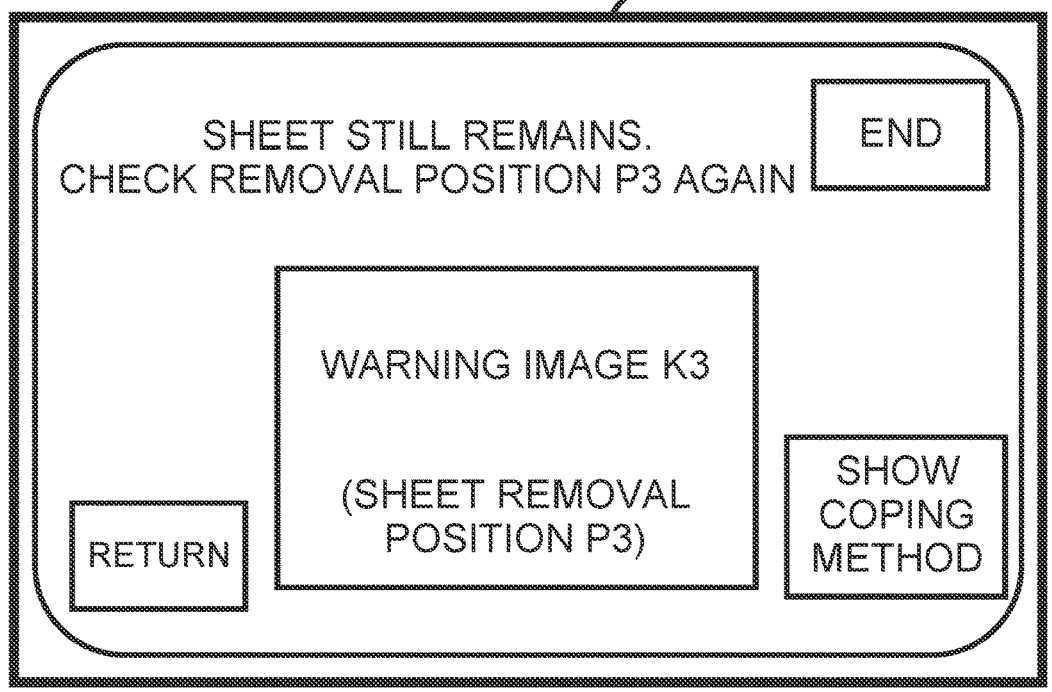
FIG. 22 is a diagram for explaining an example of a screen displayed on a display of the image forming apparatus according to the present disclosure.

Therefore, if the signal indicating that the sheet has been removed cannot be detected from the conveyed sheet detection sensor even after a predetermined period of time has elapsed, it is determined that an erroneous task has occurred during the removal of the jammed sheet, and a warning information screen as in FIG. 22 is displayed.

FIG. 22 illustrates an example of a warning information screen (sheet removal warning screen: G13) displayed when an erroneous task occurs during the removal of the jammed sheet, at occurrence of a sheet feeding error.

Text information saying "Sheet still remains. Check removal position P3 again." and a warning image K3 corresponding to the text information are displayed on the sheet removal warning screen G13 in FIG. 22.

The warning image K3 includes, for example, an image from which the sheet removal position P3 can be understood again.

In addition, the selection display area "Show coping method" is displayed on the sheet removal warning screen G13 in FIG. 22.

When the person in charge of management sees the warning screen G13 in FIG. 22, the sheet removal position P3 can be confirmed, and if the person in charge of management further desires to know the coping method, it is only required that the person in charge of management performs an input operation to select the display area of "Show coping method".

Figure 23:
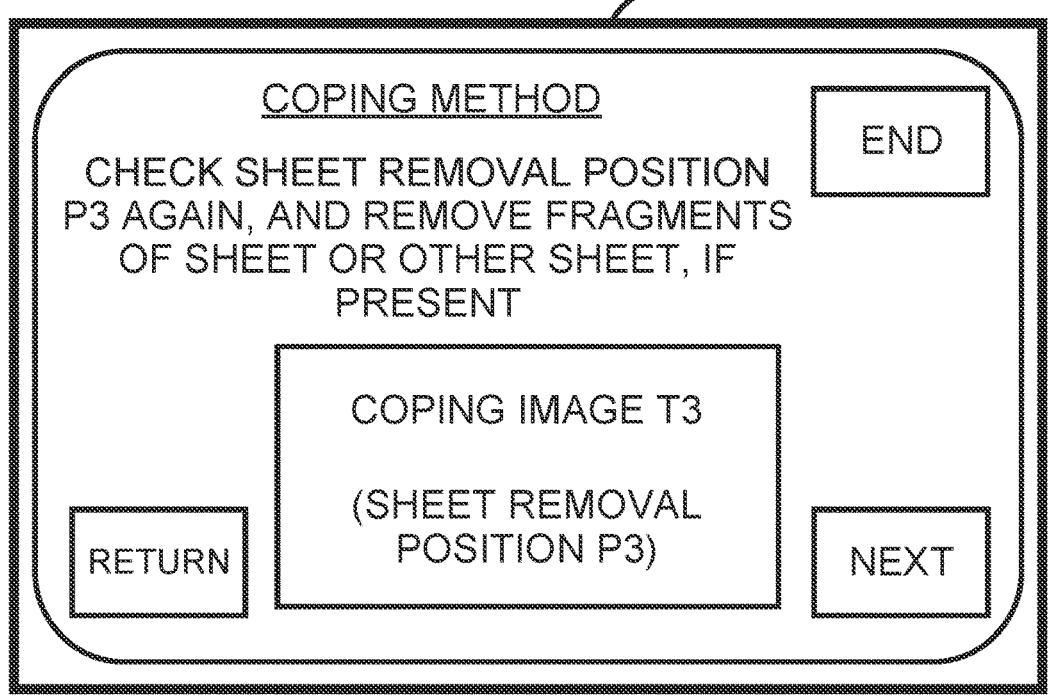
FIG. 23 is a diagram for explaining an example of a screen displayed on a display of the image forming apparatus according to the present disclosure.

When the person in charge of management performs an input operation to select the display area of "Show coping method", for example, a screen as illustrated in FIG. 23 is displayed.

For the sake of explanation, the screen G13 in FIG. 22 indicates a screen displaying only the warning information, but along with the warning information, the contents of the coping information, which will be described later, may also be displayed on the same screen.

FIG. 23 illustrates an example of a screen for explaining a coping method (sheet removal coping screen: G14) displayed when an erroneous task occurs during the removal of the jammed sheet, at occurrence of a sheet feeding error.

Text information saying "Check sheet removal position P3 again, and remove fragments of sheet or another sheet, if present." and a coping image T3 are displayed on the sheet removal coping screen G14 in FIG. 23.

In the coping image T3, for example, the sheet removal position P3 and an image (for example, a moving image) related to the procedure of the removal task are displayed.

By checking the sheet removal coping screen G14 in FIG. 23, the person in charge of management can more reliably remove the sheet from the sheet removal position P3.

Thereafter, if the person in charge of management is able to remove the sheet from the sheet removal position P3, the person in charge of management may end the display of the screen G14 by entering selection of the "End" area displayed on the coping screen G14 in FIG. 23, and resume or end the temporarily stopped display of the operation guidance for "Ink cassette replacement".

Alternatively, if the person in charge of management completely removes the sheet from the sheet removal position P3, as described above, a signal indicating that the sheet stuck at the sheet removal position P3 has been removed is output by the conveyed sheet detection sensor, and as a result of detection of the signal, it can be determined that the sheet has been completely removed.

If the signal output from the conveyed sheet detection sensor indicates that the sheet has been removed, it means that the sheet removal task is performed normally, and therefore, the display of the operation guidance for the "Sheet conveyance error" may be automatically ended.

What is claimed is:

1. An information processing apparatus having a function of explaining a predetermined operation and task contents, the information processing apparatus comprising:
    a display;
    an image capturer that captures images of the information processing apparatus and a space around the information processing apparatus and acquires image data from the captured images;
    a storage that stores operation explanation information for explaining task contents to be performed on the information processing apparatus;
    an operation explanation display controller that displays, on the display, operation explanation information related to a specific task to be performed on the information processing apparatus;
    an image recognizer that recognizes the image data acquired when the operation explanation information is displayed and acquires recognized image information, that is related to the operation explanation information displayed on the display, from the image data;
    an erroneous task determiner that determines, if the acquired recognized image information differs from contents information of the specific task indicated in the operation explanation information displayed on the display, that an erroneous task is performed on the information processing apparatus; and
    a warning processor that notifies warning information indicating that a task different from the specific task indicated in the operation explanation information displayed on the display, is performed if the erroneous task determiner determines that the erroneous task is performed.

2. The information processing apparatus according to claim 1, further comprising:
    a task detector that detects an input operation or a task performed on the information processing apparatus when the operation explanation information is displayed, and acquires the input operation or the task as detected task information, wherein
    the erroneous task determiner determines, if the acquired detected task information differs from the contents information of the specific task indicated in the operation explanation information displayed on the display, that the erroneous task is performed on the information processing apparatus.

3. The information processing apparatus according to claim 1, wherein the information processing apparatus stores, in advance, in the storage, operation explanation correspondence information that correlates the operation explanation information displayed on the display with the task contents to be performed and image contents to be subjected to image recognition, in correspondence to the operation explanation information, and
    the erroneous task determiner compares the acquired recognized image information and the acquired detected task information with the operation explanation correspondence information to determine whether the erroneous task is performed on the information processing apparatus.

4. The information processing apparatus according to claim 1, further comprising:
    a coping method processor that, if the erroneous task determiner determines that the erroneous task is performed, resolves the erroneous task and notifies coping information indicating normal task contents to be performed.

5. The information processing apparatus according to claim 4, wherein if, after the warning information is notified by the warning processor, a person, having performed a task on the information processing apparatus, performs a predetermined input operation for confirming the coping information indicating the normal task contents, the coping method processor notifies the coping information.

6. The information processing apparatus according to claim 5, wherein the information processing apparatus further stores, in advance, in the storage, erroneous task notification setting information including warning information to be notified and the coping information indicating normal task contents to be performed if the erroneous task is performed on the information processing apparatus, if the erroneous task determiner determines that the erroneous task is performed, the warning information or the coping information corresponding to task contents determined as the erroneous task is selected from the erroneous task notification setting information, and the selected warning information is notified by the warning processor, or the selected coping information is notified by the coping method processor.

7. The information processing apparatus according to claim 4, wherein the coping information is notified by at least one or both of displaying the coping information on the display and outputting the coping information by voice.

8. The information processing apparatus according to claim 1, wherein the warning information is notified by at least one or both of displaying the warning information on the display and outputting the warning information by voice.

9. The information processing apparatus according to claim 1, wherein when a predetermined function of the information processing apparatus is executed, if, after a malfunction of the information processing apparatus is detected, a task of resolving the malfunction is performed, and the erroneous task determiner determines, if the task of resolving the malfunction differs from the contents information of the specific task indicated in the operation explanation information displayed on the display, that the erroneous task is performed on the information processing apparatus.

10. The information processing apparatus according to claim 1, wherein when, after a need to replace a consumable item installed on the information processing apparatus arises, a task of replacing the consumable item is performed, and the erroneous task determiner determines, if the task of replacing the consumable item differs from the contents information of the specific task indicated in the operation explanation information displayed on the display, that the erroneous task is performed on the information processing apparatus.

11. The information processing apparatus according to claim 1, wherein when, after a need to replace a consumable item installed on the information processing apparatus arises, a task of bringing a box containing a new consumable item for a replacement to an installation position of the information processing apparatus is performed, and the erroneous task determiner determines, if it is detected that the new consumable item inside the box is not a correct consumable item based on the recognized image information acquired by the image recognizer before the box is unpacked, that the erroneous task is performed on the information processing apparatus.

12. The information processing apparatus according to claim 1, wherein the information processing apparatus is an image forming apparatus having a plurality of functions.

13. An erroneous task warning notification method of an information processing apparatus, the method comprising:

capturing images of the information processing apparatus and a space around the information processing apparatus and acquiring image data from the captured images;

storing, in advance, operation explanation information for explaining task contents to be performed on the information processing apparatus;

displaying the operation explanation information related to a specific task to be performed on the information processing apparatus;

recognizing the image data acquired when the operation explanation information is displayed and acquiring recognized image information, that is related to the operation explanation information displayed, from the image data;

determining that an erroneous task is performed on the information processing apparatus if the acquired recognized image information differs from contents information of the specific task indicated in the displayed operation explanation information; and notifying warning information, indicating that a task different from the specific task indicated in the displayed operation explanation information, is performed when determining that the erroneous task is performed.

* * * * *